(12) United States Patent
Jiang

(10) Patent No.: US 11,931,653 B2
(45) Date of Patent: Mar. 19, 2024

(54) VIRTUAL OBJECT CONTROL METHOD AND APPARATUS, TERMINAL, AND STORAGE MEDIUM

(71) Applicant: TENCENT TECHNOLOGY (SHENZHEN) COMPANY LIMITED, Shenzhen (CN)

(72) Inventor: Shuai Jiang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 140 days.

(21) Appl. No.: 17/736,955

(22) Filed: May 4, 2022

(65) Prior Publication Data

US 2022/0258056 A1 Aug. 18, 2022

Related U.S. Application Data

(63) Continuation of application No. PCT/CN2021/125705, filed on Oct. 22, 2021.

(30) Foreign Application Priority Data

Dec. 17, 2020 (CN) .......................... 202011497135.5

(51) Int. Cl.
*A63F 13/56* (2014.01)
*A63F 13/42* (2014.01)
(Continued)

(52) U.S. Cl.
CPC .............. *A63F 13/63* (2014.09); *A63F 13/42* (2014.09); *A63F 13/533* (2014.09); *A63F 13/56* (2014.09)

(58) Field of Classification Search
CPC ....................................................... A63F 13/56
See application file for complete search history.

(56) References Cited

U.S. PATENT DOCUMENTS 11,484,793 B1 * 11/2022 Franzas .................. A63F 13/53
2004/0046800 A1 3/2004 Emerson
(Continued)

FOREIGN PATENT DOCUMENTS

| CN | 107551537 A | 1/2018 |
| CN | 108499105 A | 9/2018 |

(Continued)

OTHER PUBLICATIONS

The World Intellectual Property Organization (WIPO) International Search Report for PCT/CN2021/125705 dated Jan. 18, 2022 7 Pages (including translation).

(Continued)

*Primary Examiner* — Jay Trent Liddle
(74) *Attorney, Agent, or Firm* — ANOVA LAW GROUP PLLC

(57) ABSTRACT

A virtual object control method includes: displaying a first virtual object located in a virtual environment (301); displaying one or more candidate object identifiers corresponding to one or more candidate virtual objects in the virtual environment in response to a moving operation on the first virtual object (302); and controlling, in response to a trigger operation on a target object identifier in the one or more candidate object identifiers, the first virtual object to automatically follow a target virtual object in the virtual environment (303).

20 Claims, 12 Drawing Sheets

(51) Int. Cl.
*A63F 13/533* (2014.01)
*A63F 13/63* (2014.01)

(56) References Cited

U.S. PATENT DOCUMENTS

| | | | | |
|---|---|---|---|---|
| 2005/0221880 A1* | 10/2005 | Kando | ............... | A63F 13/822 |
| | | | | 463/9 |
| 2006/0252531 A1* | 11/2006 | Kando | ............... | A63F 13/335 |
| | | | | 463/36 |
| 2006/0252540 A1* | 11/2006 | Kando | ............... | A63F 13/10 |
| | | | | 463/36 |
| 2011/0039618 A1* | 2/2011 | Ichiyanagi | ............. | A63F 13/837 |
| | | | | 463/31 |
| 2013/0072297 A1 | 3/2013 | Seegers et al. | | |
| 2015/0099581 A1* | 4/2015 | Miyama | ............. | A63F 13/56 |
| | | | | 463/31 |
| 2015/0182864 A1* | 7/2015 | Wada | ............. | A63F 13/35 |
| | | | | 463/9 |
| 2015/0279079 A1* | 10/2015 | Wieczorek | ............. | A63F 13/00 |
| | | | | 345/473 |
| 2019/0070493 A1 | 3/2019 | He | | |
| 2020/0282308 A1 | 9/2020 | Guo et al. | | |
| 2020/0338451 A1 | 10/2020 | Wang | | |
| 2020/0357163 A1 | 11/2020 | Wang | | |
| 2020/0368622 A1* | 11/2020 | Kando | ............... | G06F 1/1669 |
| 2022/0016528 A1 | 1/2022 | Ichikawa et al. | | |

FOREIGN PATENT DOCUMENTS

| | | |
|---|---|---|
| CN | 108717372 A | 10/2018 |
| CN | 108744507 A | 11/2018 |
| CN | 110465098 A | 11/2019 |
| CN | 110755841 A | 2/2020 |
| CN | 111760289 A | 10/2020 |
| CN | 112044069 A | 12/2020 |
| CN | 112604305 A | 4/2021 |
| JP | 2009233208 A | 10/2009 |
| JP | 2019209115 A | 12/2019 |
| TW | I480078 B | 4/2015 |
| WO | 2019184771 A1 | 10/2019 |
| WO | 2020110246 A1 | 6/2020 |

OTHER PUBLICATIONS

Taiwan Intellectual Property Office Examination report for Application No. 110141924 dated Sep. 15, 2022 10 pages (including translation).

China National Intellectual Property Administration (CNIPA) Office Action 1 for 202011497135.5 dated May 7, 2022 9 Pages (including translation).

The Japan Patent Office (JPO) Decision to Grant a Patent for Application No. 2022-563073 and Translation dated Jul. 24, 2023 5 Pages.

[Mobile Legend] They are reference and [Jul. 18, 2023 search] about middle-class person-oriented capture,Aug. 23, 2019, http://trokiss-gamer.com/smartphone-game/no-224/, and the description especially about a hero lock mode.

* cited by examiner

VIRTUAL OBJECT CONTROL METHOD AND APPARATUS, TERMINAL, AND STORAGE MEDIUM

CROSS-REFERENCES TO RELATED APPLICATIONS

This application is a continuation application of PCT Patent Application No. PCT/CN2021/125705, filed on Oct. 22, 2021, which claims priority to Chinese Patent Application No. 202011497135.5, entitled "VIRTUAL OBJECT CONTROL METHOD AND APPARATUS, TERMINAL, AND STORAGE MEDIUM" filed on Dec. 17, 2020, the entire contents of both of which are incorporated herein by reference.

FIELD OF THE TECHNOLOGY

Embodiments of the present disclosure relate to the field of human-computer interaction technologies, and in particular, to a virtual object control method and apparatus, a terminal, a storage medium, and a program product.

BACKGROUND OF THE DISCLOSURE

A battle game is a game in which a plurality of user accounts compete in the same scene. A player can operate a virtual object in a virtual environment to perform motions such as walking, running, climbing, and shooting. In a process that multiplayer teams fight together, the player can actively control a direction of the virtual object through a joystick, or control the virtual object to automatically follow a virtual object controlled by another player to move.

In the related technology, an automatic following control is disposed on a battle interface, and the player can trigger the automatic following control, so that the virtual object automatically follows another virtual object in the same camp, for example, automatically follows a virtual object of a leader in a team by default, or selects a virtual object intended to be followed from a camp list.

However, in the related technology, the method for controlling a virtual object to automatically follow another virtual object requires a user to manually open a virtual object list of the same camp, select a following object from the list, and then trigger the following control. These operations are relatively cumbersome, and only the virtual object in the same camp can be followed actively.

SUMMARY

Embodiments of the present disclosure provide a virtual object control method and apparatus, a terminal, a storage medium, and a program product, to simplify a user operation of controlling a first virtual object to perform automatic following. The technical solutions are as follows:

According to an aspect, an embodiment of the present disclosure provides a virtual object control method, applied to a terminal, the method including: displaying a first virtual object located in a virtual environment; displaying one or more candidate object identifiers corresponding to one or more candidate virtual objects in the virtual environment in response to a moving operation on the first virtual object, the one or more candidate virtual objects being located in a facing-direction region of the first virtual object; and controlling, in response to a trigger operation on a target object identifier in the one or more candidate object identifiers, the first virtual object to automatically follow a target virtual object in the virtual environment, the target virtual object being a virtual object corresponding to the target object identifier.

According to another aspect, an embodiment of the present disclosure provides a virtual object control apparatus, including: a first display module, configured to display a first virtual object located in a virtual environment; a second display module, configured to display one or more candidate object identifiers corresponding to one or more candidate virtual objects in the virtual environment in response to a moving operation on the first virtual object, the one or more candidate virtual objects being located in a facing-direction region of the first virtual object; and a first control module, configured to control, in response to a trigger operation on a target object identifier in the one or more candidate object identifiers, the first virtual object to automatically follow a target virtual object in the virtual environment, the target virtual object being a virtual object corresponding to the target object identifier.

According to another aspect, an embodiment of the present disclosure provides a terminal, including a processor and a memory, the memory storing at least one instruction, at least one program, a code set or an instruction set, the at least one instruction, the at least one program, the code set or the instruction set being loaded and executed by the processor to implement the virtual object control method in the foregoing aspect.

According to another aspect, an embodiment of the present disclosure provides a non-transitory computer-readable storage medium, storing at least one computer program, the computer program being loaded and executed by a processor to implement the virtual object control method described in the foregoing aspect.

In the embodiments of the present disclosure, one or more candidate object identifiers are displayed when a moving operation on a first virtual object is received, so that a user can clearly determine virtual objects in a facing-direction region of the first virtual object through the one or more candidate object identifiers when controlling the first virtual object to move, and select a target virtual object from one or more candidate virtual objects through a trigger operation. Therefore, the first virtual object automatically follows the target virtual object, and there is no need to select a following object from a virtual object list and perform a following operation, thereby simplifying a user operation, and improving efficiency of making the first virtual object enter an automatic following state. The one or more candidate virtual objects are determined based on an orientation of the first virtual object, so that the determined one or more candidate virtual objects meet actual operation needs of the user better, and validity of the one or more candidate object identifiers are improved.

DESCRIPTION OF EMBODIMENTS

First, terms involved in the embodiments of the present disclosure are introduced as follows:

1) Virtual environment

It is a virtual environment displayed (or provided) when an application is run on a terminal. The virtual environment may be a simulated environment of a real world, or may be a semi-simulated semi-fictional three-dimensional environment (3D), or may be an entirely fictional 3D environment. The virtual environment may be any one of a 2D virtual environment, a 2.5-dimensional virtual environment, and a 3D virtual environment, an example in which the virtual environment is a 3D virtual environment is used for description in the following embodiment, but this is not limited. In some embodiments, the virtual environment is further used for a virtual environment battle between at least two virtual roles. In some embodiments, there are virtual resources available to the at least two virtual roles in the virtual environment.

2) Virtual object

A virtual object is a movable object in a virtual scene. The movable object may be at least one of a virtual character, a virtual animal, and an animation character. In some embodiments, when the virtual scene is a 3D virtual scene, the virtual object may be a 3D model. Each virtual object has a shape and a volume in the 3D virtual scene, and occupies some space in the 3D virtual scene. In some embodiments, the virtual role is a 3D role constructed based on a 3D human skeleton technology. The virtual role wears different skins to implement different appearances. In some implementations, the virtual role may be alternatively implemented by using a 2.5-dimensional model or a 2D model. This is not limited in this embodiment of the present disclosure.

3) User interface (UI) control: It is any visual control or element that can be seen in a UI of an application, such as a picture control, an input box control, a text box control, a button control, or a label control. Some UI controls respond to an operation of a user.

Figure 1:
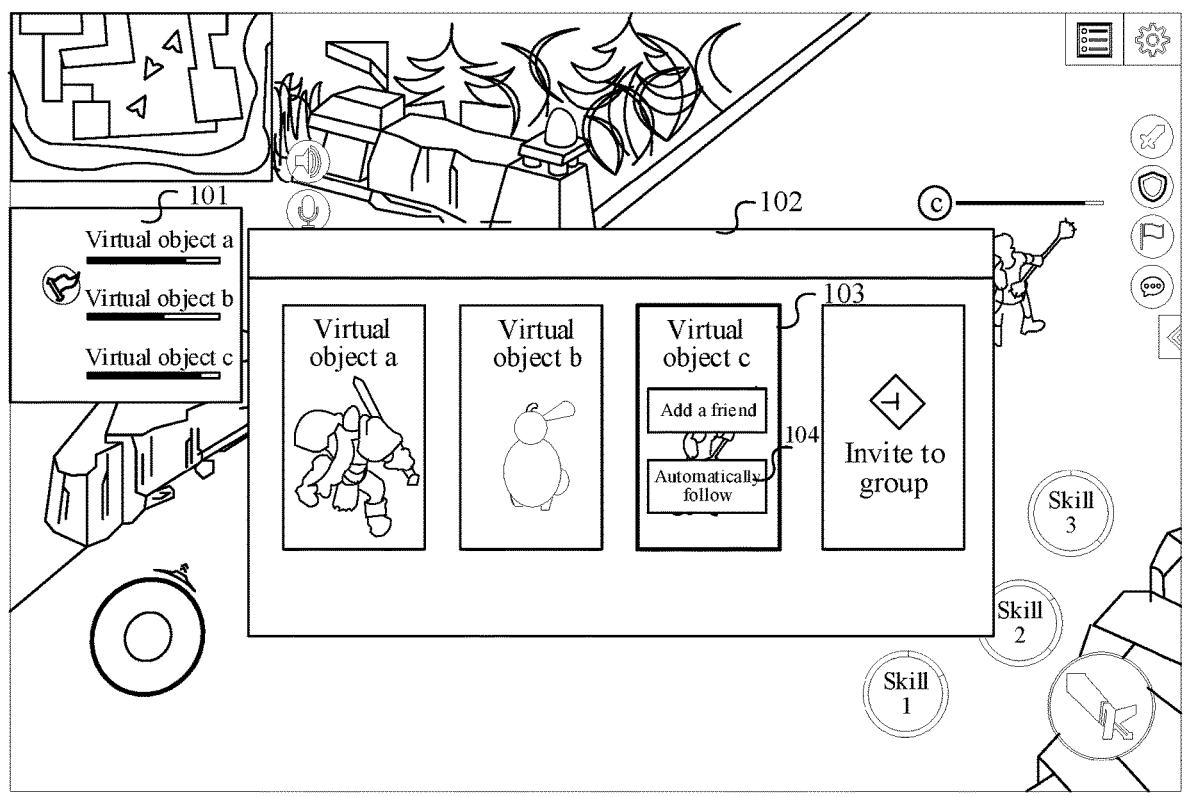
FIG. 1 is a schematic diagram of triggering a first virtual object to perform automatic following in the related technology.

In the related technology, a game application usually can provide an automatic following function for a first virtual object, and a user selects a virtual object that the first virtual object needs to follow through a corresponding operation, so that the first virtual object automatically follows the virtual object. As shown in FIG. 1, when receiving a trigger operation on a virtual object list 101, a terminal displays a virtual object selection interface 102, and the virtual object selection interface 102 includes object selection controls of virtual objects. When receiving a trigger operation on an object selection control 103 of a virtual object c, the terminal displays an automatic following control 104, and a user may trigger the automatic following control 104, so that a first virtual object automatically follows the virtual object c.

In the foregoing related technology, the method for controlling a virtual object to automatically follow another virtual object requires the user to manually open the virtual object list, select a following object from the list, and then trigger the automatic following control. These operations are relatively cumbersome, and the virtual object selection interface blocks a virtual environment picture during a user operation, which affects observation on a virtual environment and other operations of the user.

To resolve the foregoing problems, the present disclosure provides a virtual object control method. A terminal determines candidate virtual objects in an orientation of a first virtual object based on a control operation of a user on a virtual joystick, and displays candidate object identifiers, so that the user can rapidly control, by using a simple trigger operation, the first virtual object to automatically follow the target virtual object, thereby simplifying a user operation, and improving efficiency of controlling the first virtual object to perform automatic following.

Figure 2:
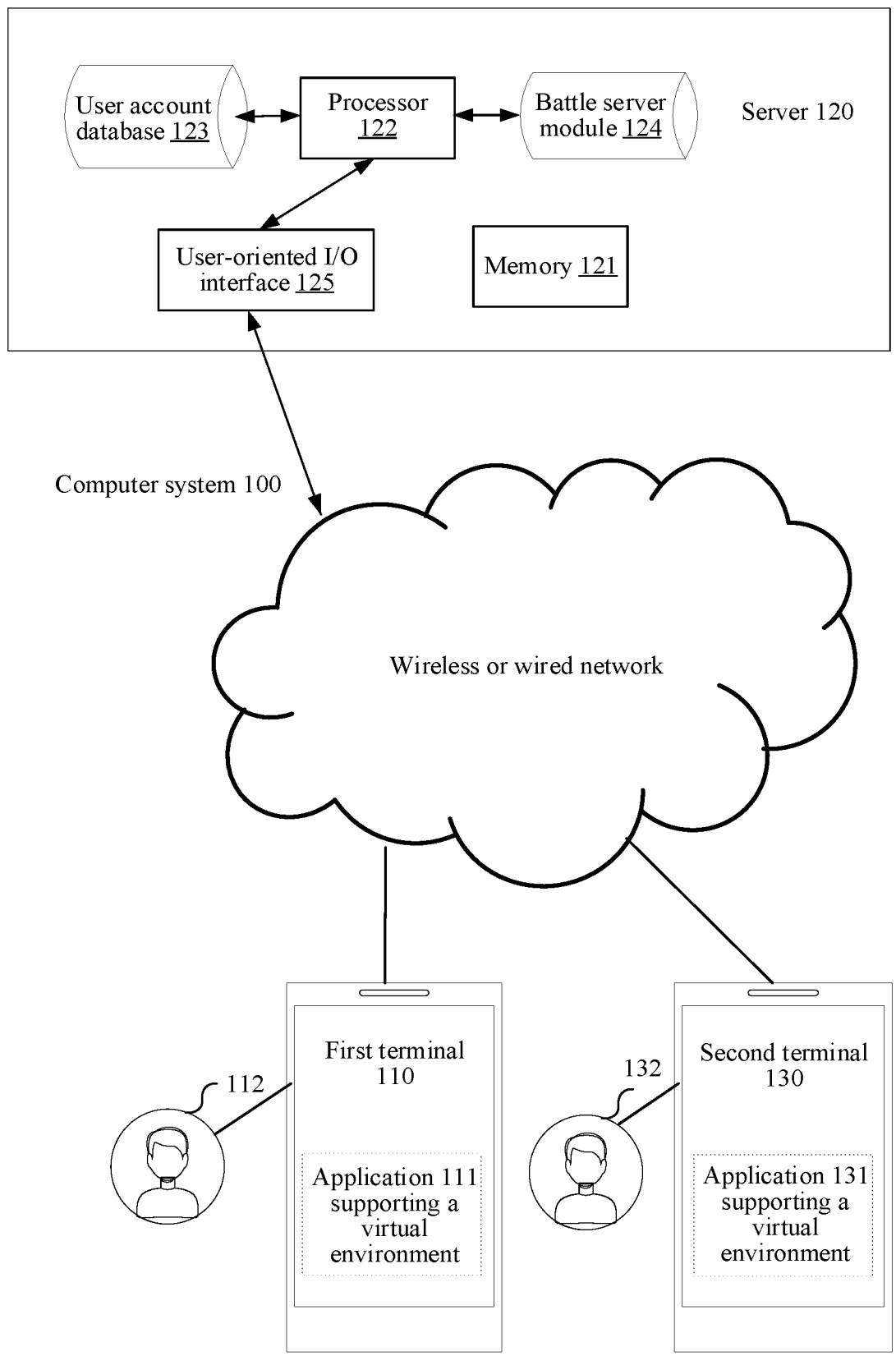
FIG. 2 is a schematic diagram of an implementation environment according to an exemplary embodiment of the present disclosure.

FIG. 2 is a schematic diagram of an implementation environment according to an embodiment of the present disclosure. The implementation environment may include: a first terminal 110, a server 120, and a second terminal 130.

An application 111 supporting a virtual environment is installed and run on the first terminal 110. When the first terminal runs the application 111, a UI of the application 111 is displayed on a screen of the first terminal 110. The application 111 may be any one of a military simulation program, a multiplayer online battle arena (MOBA) game, an escape shooting game, and a simulation game (SLG). In this embodiment, an example in which the application 111 is a role-playing game (RPG) is used for description. The first terminal 110 is a terminal used by a first user 112. The first user 112 uses the first terminal 110 to control a first virtual object located in the virtual environment to perform activities, and the first virtual object may be referred to as a master virtual object of the first user 112. The activities of the first virtual object include, but are not limited to: at least one of adjusting body postures, crawling, walking, running, riding, flying, jumping, driving, picking, shooting, attacking, throwing, and skill releasing. Exemplarily, the first virtual object is a first virtual character such as a simulated character or an animation character. In the server, a user of the application may be referred to with a user account.

An application 131 supporting a virtual environment is installed and run on the second terminal 130. When the second terminal 130 runs the application 131, a UI of the application 131 is displayed on a screen of the second terminal 130. The client may be any one of a military simulation program, a MOBA game, an escape shooting game, and an SLG game. In this embodiment, an example in which the application 131 is an RPG is used for description. The second terminal 130 is a terminal used by a second user 132. The second user 132 uses the second terminal 130 to control a second virtual object located in the virtual environment to perform activities, and the second virtual object may be referred to as a master virtual role of the second user 132. Exemplarily, the second virtual object is a second virtual character such as a simulated character or an animation character.

In some embodiments, the first virtual object and the second virtual object are located in the same virtual world. In some embodiments, the first virtual object and the second virtual object may belong to the same camp, the same team, or the same organization, have a friend relationship with each other, or have a temporary communication permission. In some embodiments, the first virtual object and the second virtual object may belong to different camps, different teams, or different organizations, or have a hostile relationship with each other. The first user 112 may use the first terminal 110 to control the first virtual object to automatically follow the second virtual object controlled by the second user 132 in a virtual environment, and similarly, the second user 132 may use the second terminal 130 to control the second virtual object to automatically follow the first virtual object controlled by the first user 112 in the virtual environment.

In some embodiments, the applications run on the first terminal 110 and the second terminal 130 are the same, or the applications installed on the two terminals are the same type of applications on different operating system platforms (Android system or iOS system). The first terminal 110 may generally refer to one of a plurality of terminals, and the second terminal 130 may generally refer to one of a plurality of terminals. In this embodiment, only the first terminal 110 and the second terminal 130 are used as an example for description. The first terminal 110 and the second terminal 130 are of the same or different device types. The device type includes at least one of a smartphone, a tablet computer, an e-book reader, a Moving Picture Experts Group Audio Layer III (MP3) player, a Moving Picture Experts Group Audio Layer IV (MP4) player, a laptop, and a desktop computer.

FIG. 2 shows only two terminals. However, a plurality of other terminals may access the server 120 in different embodiments. In some embodiments, one or more terminals are terminals corresponding to a developer. A developing and editing platform for the application supporting a virtual environment is installed on the terminal. The developer may edit and update the application on the terminal and transmit an updated application installation package to the server 120 by using a wired or wireless network. The first terminal 110 and the second terminal 130 may download the application installation package from the server 120 to update the application.

The first terminal 110, the second terminal 130, and the other terminals are connected to the server 120 through a wireless or wired network.

The server 120 includes at least one of one server, a server cluster including a plurality of servers, a cloud computing platform, and a virtualization center. The server 120 is configured to provide backend services for an application supporting a 3D virtual environment. In some embodiments, the server 120 is responsible for primary computing work, and the terminal is responsible for secondary computing work; the server 120 is responsible for secondary computing work, and the terminal is responsible for primary computing work; or the server 120 and the terminal perform collaborative computing by using a distributed computing architecture between each other.

In an exemplary example, the server 120 includes a memory 121, a processor 122, a user account database 123, a battle service module 124, and a user-oriented input/output (I/O) interface 125. The processor 122 is configured to load instructions stored in the server 120, and process data in the user account database 123 and the battle service module 124. The user account database 123 is configured to store data of user accounts used by the first terminal 110, the second terminal 130, and the another terminal, for example, avatars of the user accounts, nicknames of the user accounts, battle effectiveness indexes of the user accounts, and service zones of the user accounts. The battle service module 124 is configured to provide a plurality of battle rooms for the users to battle, for example, a 1V1 battle room, a 3V3 battle room, and a 5V5 battle room. The user-oriented I/O interface 125 is configured to establish communication between the first terminal 110 and/or the second terminal 130 through a wireless or wired network for data exchange.

Figure 3:
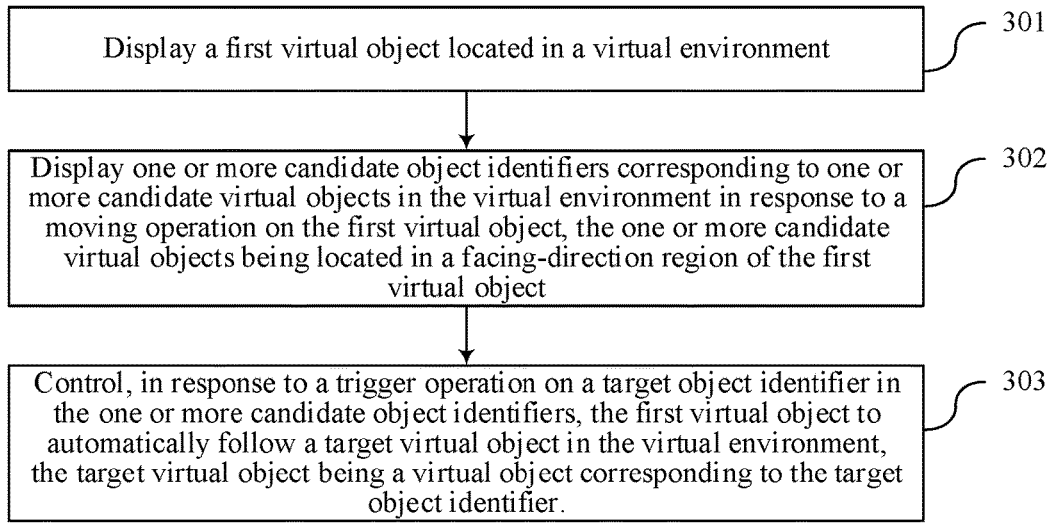
FIG. 3 is a flowchart of a virtual object control method according to an exemplary embodiment of the present disclosure.

FIG. 3 is a flowchart of a virtual object control method according to an exemplary embodiment of the present disclosure. In this embodiment, an example in which the method is applied to a terminal supporting a virtual environment is used for description. The method includes the following steps:

Step 301. Display a first virtual object in a virtual environment.

In one embodiment, the terminal displays the virtual environment through a virtual environment picture. The virtual environment picture is a picture of observing a virtual environment from the perspective of a virtual object. The perspective is an observation angle for observation from a first-person perspective or a third-person perspective of the virtual object in the virtual environment. In this embodiment of the present disclosure, the perspective is an angle for observing the virtual object by using a camera model in the virtual environment.

In some embodiments, the camera model automatically follows the virtual object in the virtual environment. That is, when a position of the virtual object in the virtual environment changes, a position of the camera model following the virtual object in the virtual environment changes simultaneously, and the camera model is always within a preset distance range of the virtual object in the virtual environment. During automatic following, relative positions of the camera model and the virtual object remain unchanged.

The camera model is a 3D model located around a virtual object in a virtual environment. When the first-person perspective is used, the camera model is located nearby the head of the virtual object or at the head of the virtual object. When the third-person perspective is used, the camera model may be located behind the virtual object and bound to the virtual object, or may be located at any position away from the virtual object by a preset distance. The virtual object located in the virtual environment may be observed from different angles through the camera model. In some embodiments, when the third-person perspective is a first-person over-shoulder perspective, the camera model is located behind the virtual object (for example, the head and shoulders of the virtual character). In some embodiments, in addition to the first-person perspective and the third-person perspective, the perspective also includes other perspectives, such as a top perspective. When the top perspective is used, the camera model may be located above the head of the virtual object. The top perspective is a perspective for observing the virtual environment at an angle from the air. In some embodiments, the camera model is not actually displayed in the virtual environment. In other words, the camera model is not displayed in the virtual environment displayed in the UI. An example in which the camera model is located at any position away from the virtual object by the preset distance is used for description. In some embodiments, one virtual object corresponds to one camera model, and the camera model may rotate with the virtual object as a rotation center. For example, the camera model is rotated with any point of the virtual object as the rotation center. During rotation, the camera model is not only rotated at an angle, but also displaced. During rotation, a distance between the camera model and the rotation center remains unchanged, that is, the camera model is rotated on a surface of a sphere with the rotation center as a sphere center. Any point of the virtual object may be the head or the torso of the virtual object, or any point around the virtual object. This is not limited in this embodiment of the present disclosure. In some embodiments, when the camera model observes the virtual object, a center of the perspective of the camera model points to a direction from a point on the spherical surface at which the camera model is located to the sphere center.

In some embodiments, the camera model may alternatively observe the virtual object at a preset angle in different directions of the virtual object.

In some embodiments, the virtual environment picture in this embodiment of the present disclosure is a picture of observing the virtual environment from the perspective of a first virtual object. The first virtual object is a virtual object corresponding to an account that the terminal logs in to a game application. A user may control, through different trigger operations, the first virtual object to move, jump, drive, pick, perform skill releasing, and the like, and the trigger operations may be implemented through trigger gestures, voice instructions, control operations for function controls, and the like. In one embodiment, the user controls a virtual joystick to move the first virtual object in the virtual environment. The first virtual object is a virtual object corresponding to a currently login account of the application.

Figure 4:
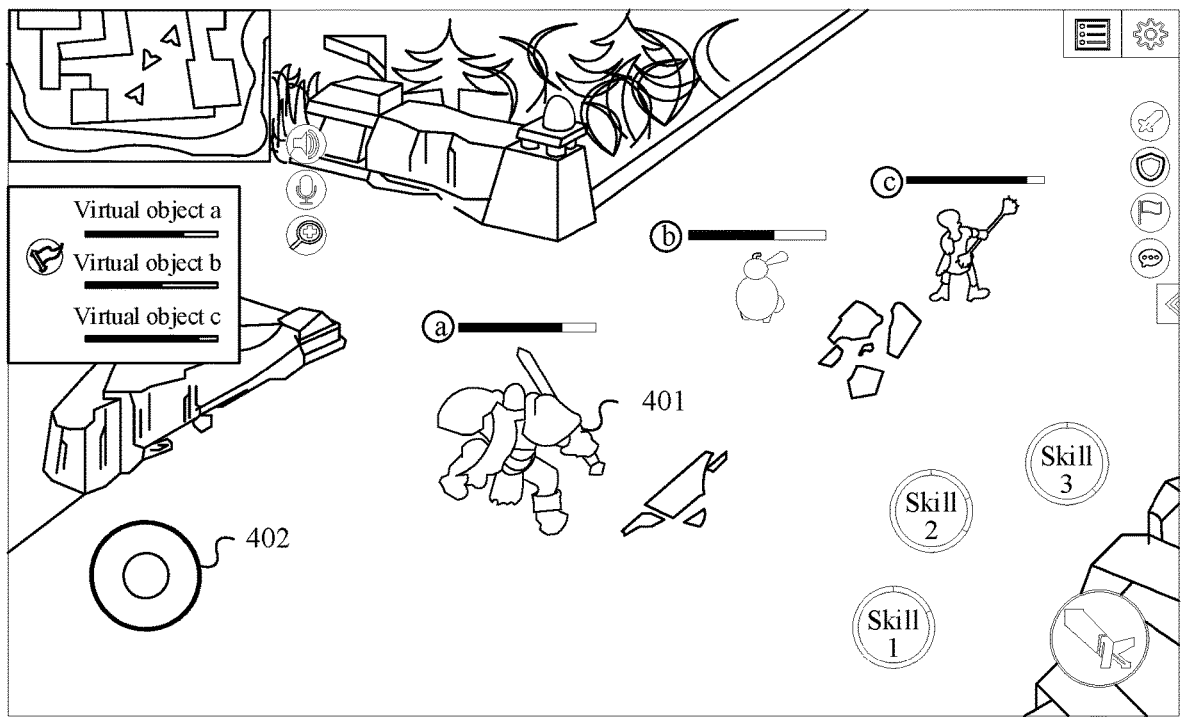
FIG. 4 is a schematic diagram of a virtual environment picture according to an exemplary embodiment of the present disclosure.

Exemplarily, as shown in FIG. 4, a virtual environment picture and a virtual joystick 402 are displayed in a virtual environment interface, the virtual environment picture includes a first virtual object 401, and the virtual joystick 402 is located at a lower left corner of the virtual environment interface. When the terminal does not receive a trigger operation on the virtual joystick 402, and the first virtual object is not in an automatic following state, the virtual joystick 402 is displayed in a default state. The virtual environment interface shown in FIG. 4 further includes a map display control, a skill releasing control, an ordinary attack control, and other controls, and the virtual environment picture further includes other virtual objects in addition to the first virtual object, and virtual things such as roads and plants in a certain range.

Step 302. Display one or more candidate object identifiers corresponding to one or more candidate virtual objects in the virtual environment in response to a moving operation on the first virtual object, the one or more candidate virtual objects being located in a facing-direction region of the first virtual object.

An orientation (also referred as a facing-direction) is a direction in which a terminal controls a virtual object to move in a virtual environment, and the facing-direction region is a region formed along an orientation of the first virtual object, e.g., a region that the first virtual object faces towards. The user performs a control operation on the virtual joystick, the terminal controls, based on the control operation, the first virtual object to move in the virtual environment, and a moving direction is a direction indicated by the control operation. Exemplarily, the control operation may be a drag operation on the virtual joystick, a trigger operation on a direction control in the virtual joystick, or the like.

In some embodiments, the moving operation on the first virtual object is a touch operation on a virtual joystick in a virtual environment interface, or a control operation on a movement joystick in a control device (for example, a game handle) connected to the terminal, or the like. This is not limited in this embodiment of the present disclosure.

For example, the terminal determines an orientation of the first virtual object based on the control operation on the virtual joystick, detects virtual objects in the facing-direction region in a process of controlling the first virtual object to move along the orientation, and displays one or more candidate object identifiers corresponding to one or more candidate virtual objects when the one or more candidate virtual objects exist in the facing-direction region. The terminal updates the one or more candidate object identifiers in real time during the control operation, so that the user can observe the one or more candidate object identifiers to learn about the one or more candidate virtual objects existing in the facing-direction region while controlling the first virtual object to move.

In some embodiments, the one or more candidate virtual objects and the first virtual object belong to the same camp, or the one or more candidate virtual objects and the first virtual object belong to different camps, or the one or more candidate virtual objects may be virtual objects belonging to the same camp as the first virtual object or virtual objects belonging to different camps from the first virtual object, that is, the one or more candidate virtual objects include virtual objects of the same camp and virtual objects of other camps that meet a preset condition.

In some embodiments, the one or more candidate object identifiers display at least one of model thumbnails of the one or more candidate virtual objects and account identifiers of accounts corresponding to the one or more candidate virtual objects.

Figure 5:
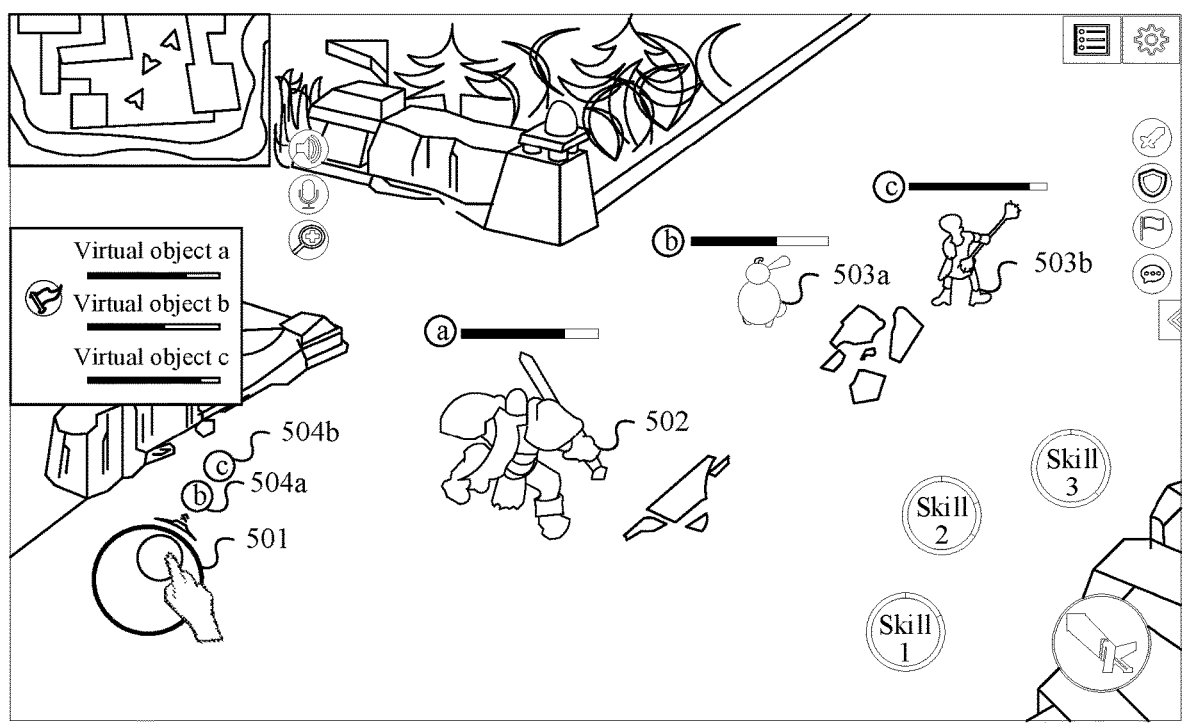
FIG. 5 is a schematic diagram of triggering to display candidate object identifiers according to an exemplary embodiment of the present disclosure.

Exemplarily, as shown in FIG. 5, after receiving a control operation on a virtual joystick 501, the terminal determines that a candidate virtual object 503a and a candidate virtual object 503b exist in a facing-direction region corresponding to a first virtual object 502, and displays a candidate object identifier 504a corresponding to the candidate virtual object 503a and a candidate object identifier 504b corresponding to the candidate virtual object 503b outside the virtual joystick 501.

In some embodiments, after receiving a moving operation on the first virtual object, the terminal determines the candidate virtual objects based on the moving operation; the terminal reports control information (for example, an orientation of the first virtual object) corresponding to the control operation to a server, and the server is configured to determine the facing-direction region based on the orientation of the first virtual object and position information of virtual objects in the virtual environment, determine the candidate virtual objects based on the facing-direction region, and feed back the candidate virtual objects to the terminal; and the process of determining the candidate virtual objects may alternatively be collaboratively completed by the terminal and the server. For example, the terminal determines the orientation of the first virtual object based on the moving operation on the first virtual object, and reports related information of the candidate virtual objects and the control operation to the server after determining the candidate virtual objects in the facing-direction region; and the server verifies the candidate virtual objects based on the control operation and the position information of the virtual objects in the virtual environment, and sends feedback information indicating that the verification succeeds to the terminal after the verification succeeds, so that the terminal continues to perform subsequent operations. This is not limited in this embodiment of the present disclosure.

Step 303. Control, in response to a trigger operation on a target object identifier in the candidate object identifiers, the first virtual object to automatically follow a target virtual object in the virtual environment, the target virtual object being a virtual object corresponding to the target object identifier. The first virtual object automatically following the target virtual object may refer to that the first virtual object automatically moves in a same direction as the target virtual object in the virtual environment. For example, current coordinates of the first virtual object in the virtual environment (e.g., a virtual map) can be the same as coordinates of the target virtual object at a previous moment. The automatic following may apply to directional steering movements of the virtual objects.

The target object identifier is an identifier of the trigger operation received in the candidate object identifiers displayed in the terminal. When receiving the trigger operation on the target object identifier, the terminal controls the first virtual object to automatically follow the target virtual object in the virtual environment. For example, the terminal controls the first virtual object to move toward a position of the target virtual object, to reduce or maintain a distance between the first virtual object and the target virtual object. When the target virtual object moves in a direction, the terminal automatically controls the first virtual object to move toward the target virtual object. When the target virtual object stops at a position, and the distance between the first virtual object and the target virtual object is less than or equal to a preset distance, the terminal controls the first virtual object to stop at a current position; or when the distance between the first virtual object and the target virtual object is greater than the preset distance, the terminal still controls the first virtual object to move toward the target virtual object, until the distance between the first virtual object and the target virtual object is equal to the preset distance.

In some embodiments, the trigger operation includes a touch operation (for example, a click operation, a press operation, or a slide operation) on the candidate object identifiers in the virtual environment interface, or the trigger operation is implemented by a trigger operation on a corresponding key in a control device. The trigger operation on the target object identifier and the moving operation on the first virtual object are two independent operations, or the trigger operation on the target object identifier is a continuation of the moving operation on the first virtual object, for example, the moving operation on the first virtual object is a drag operation on the virtual joystick. When the drag operation continues to a candidate object identifier and ends, a candidate virtual object corresponding to the candidate object identifier is determined as the target virtual object, thereby improving convenience of the trigger operation, so that the user can quickly switch from a control operation on the virtual joystick to the trigger operation on the target object identifier. This is not limited in this embodiment of the present disclosure.

Exemplarily, as shown in FIG. 5, when receiving a trigger operation on a candidate object identifier 504a, the terminal determines the candidate object identifier 504a as the target object identifier, determines a candidate virtual object 503a as the target virtual object, and controls the first virtual object 502 to automatically follow the target virtual object in the virtual environment.

In conclusion, in the embodiments of the present disclosure, candidate object identifiers are displayed when a moving operation on a first virtual object is received, so that a user can clearly determine virtual objects in a facing-direction region of the first virtual object through the candidate object identifiers when controlling the first virtual object to move, and select a target virtual object from candidate virtual objects through a trigger operation. Therefore, the first virtual object automatically follows the target virtual object, and there is no need to select a following object from a virtual object list and perform a following operation, thereby simplifying a user operation, and improving efficiency of making the first virtual object enter an automatic following state. The candidate virtual objects are determined based on an orientation of the first virtual object, so that the determined candidate virtual objects meet actual operation needs of the user better, and validity of the candidate object identifiers are improved.

Figure 6:
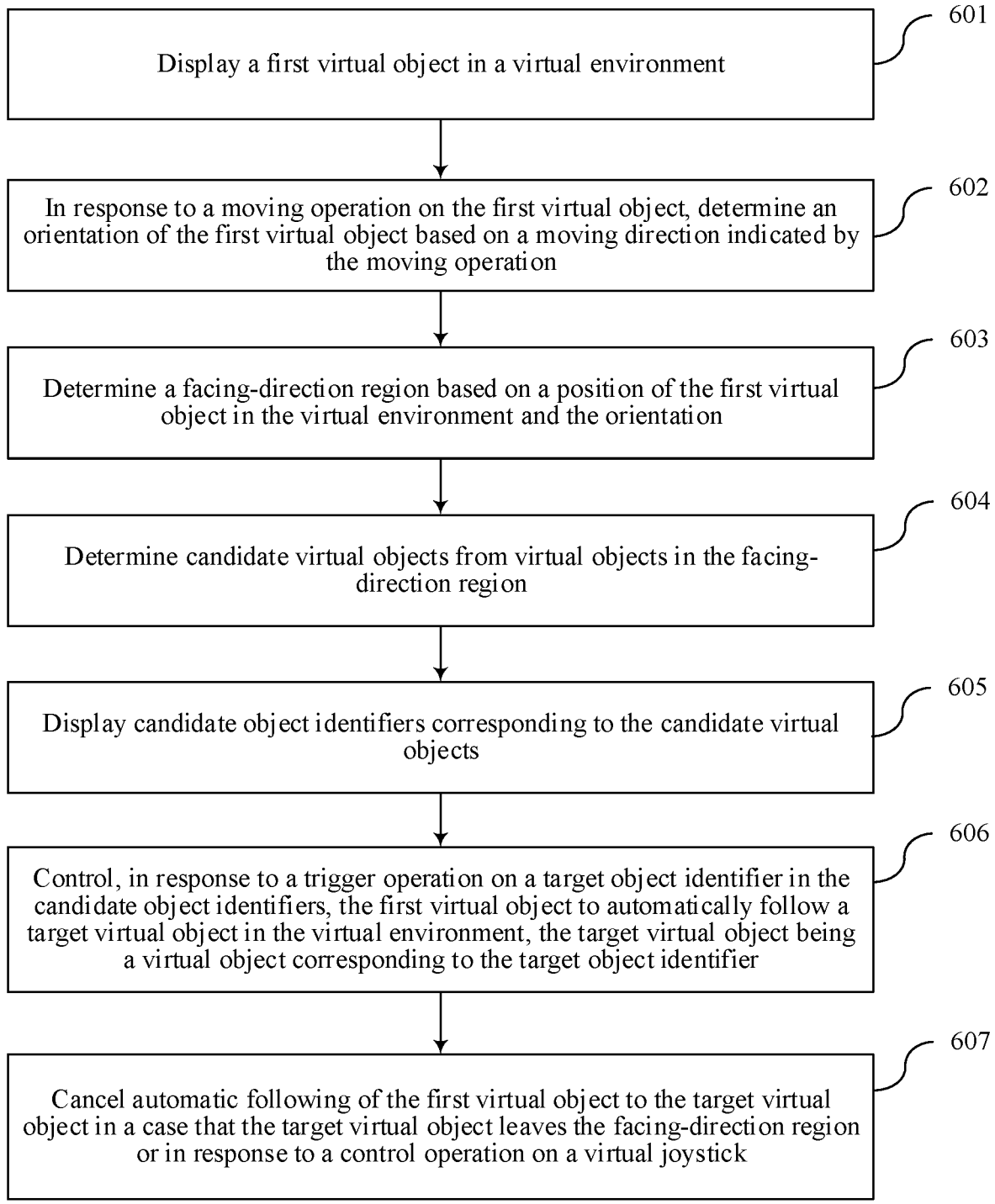
FIG. 6 is a flowchart of a virtual object control method according to another exemplary embodiment of the present disclosure.

In one embodiment, the terminal determines the facing-direction region based on the position of the first virtual object and the orientation, and determines the candidate virtual objects from the facing-direction region. FIG. 6 is a flowchart of a virtual object control method according to another exemplary embodiment of the present disclosure. In this embodiment, an example in which the method is applied to a terminal supporting a virtual environment is used for description. The method includes the following steps:

Step 601. Display a first virtual object in a virtual environment.

For the specific implementation of step 601, reference may be made to step 301, and details are not described again in this embodiment of the present disclosure.

Step 602. In response to a moving operation on the first virtual object, determine an orientation of the first virtual object based on a moving direction indicated by the moving operation.

In one embodiment, a user controls the moving direction of the first virtual object through the moving operation on the first virtual object, and the terminal determines the orientation of the first virtual object based on the moving direction indicated by the moving operation, and controls the first virtual object to move along the orientation.

In some embodiments, the moving operation on the first virtual object is a touch operation on a virtual joystick in a virtual environment interface, or a control operation on a movement joystick in a control device (for example, a game handle) connected to the terminal, or the like. This is not limited in this embodiment of the present disclosure.

Exemplarily, the virtual joystick is a rotatable control, and is provided with a joystick direction, and the user changes the joystick direction by rotating the virtual joystick, so that the terminal determines the orientation of the first virtual object based on the joystick direction after rotation; or, the virtual joystick includes a movable joystick portion and an immovable wheel portion, and the user controls movement of the joystick portion in the wheel portion, so that the terminal determines the orientation of the first virtual object. For example, a straight line in which a center of the joystick portion and a center of the wheel portion are located is parallel to a straight line in which the orientation of the first virtual object is located, and the orientation is a direction in which the center of the wheel portion points to the center of the joystick portion.

Figure 7:
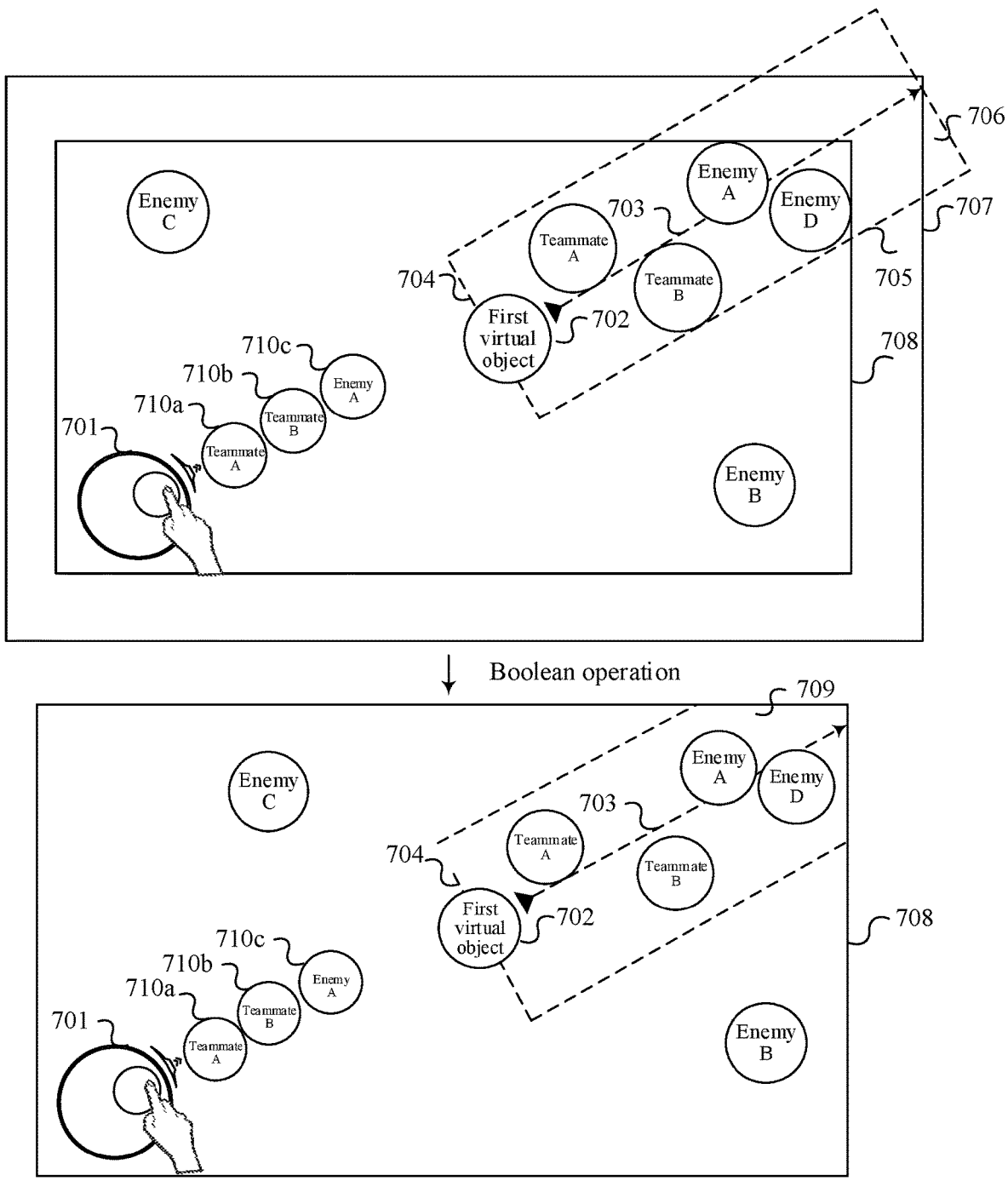
FIG. 7 is a schematic diagram of determining a facing-direction region according to an exemplary embodiment of the present disclosure.

Exemplarily, as shown in FIG. 7, the user controls a moving direction of a first virtual object 702 by dragging a joystick portion in a virtual joystick 701, and the terminal determines, based on the moving direction, an orientation of the first virtual object 702, namely, a direction indicated by a ray 703.

Step 603. Determine a facing-direction region based on a position of the first virtual object in the virtual environment and the orientation.

In one embodiment, the terminal determines the facing-direction region based on the position of the first virtual object in the virtual environment and the orientation, and determines candidate virtual objects from the facing-direction region, so that the user may know the candidate virtual objects in the facing-direction region of the first virtual object in real time when controlling the first virtual object to move. Step 603 includes the following steps:

Step 603*a*. Determine an orientation framing region based on the position of the first virtual object and the orientation, the orientation framing region being a rectangular region formed along the orientation, a width of the rectangular region being a preset width, the first virtual object being located at a shorter side of the rectangular region, and a length of a longer side of the rectangular region being a distance from the first virtual object to a virtual environment boundary in a direction of the orientation.

In one embodiment, the terminal determines the orientation framing region based on the orientation of the first virtual object, and the orientation framing region is used for selecting the facing-direction region from a virtual environment picture. The terminal takes a line segment which passes through the position of the first virtual object and is perpendicular to the orientation as a shorter side of the orientation framing region, and takes a line segment which is parallel to the orientation and whose length is equal to the distance from the first virtual object to the virtual environment boundary in the direction of the orientation as a longer side, to determine the rectangular orientation framing region. A length of the shorter side is a preset length, a length of the longer side is equal to the distance from the first virtual object to the virtual environment boundary in the direction of the orientation (namely, a distance from the position of the first virtual object to an intersection of the orientation and the virtual environment boundary). In some embodiments, the position of the first virtual object is a middle point of the shorter side of the orientation framing region, or the position of the first virtual object is any position located in the shorter side of the orientation framing region.

Exemplarily, as shown in FIG. 7, the terminal takes a line segment 704 in which a position of the first virtual object 702 is located as a shorter side, and takes a line segment 705 in which the ray 703 parallel to the orientation is located as a longer side, to obtain an orientation framing region 706. A length of the line segment 705 is equal to a distance from the position of the first virtual object 702 to a virtual environment boundary 707 along an orientation, and a length of the line segment 704 is the preset length.

In some embodiments, after receiving the moving operation on the first virtual object, the terminal determines the facing-direction region based on the moving operation; the terminal reports control information (for example, the orientation of the first virtual object) corresponding to the moving operation to a server, and the server is configured to determine the facing-direction region based on the orientation of the first virtual object and position information, and feed back position information of the facing-direction region to the terminal; and the process of determining the facing-direction region may alternatively be collaboratively completed by the terminal and the server. For example, the terminal reports the position information of the facing-direction region and the position and orientation information of the first virtual object to the server after determining the facing-direction region based on the position the first virtual object and the orientation; and the server verifies, based on the position of the first virtual object, and the orientation, the facing-direction region determined by the terminal, and sends feedback information indicating that the verification succeeds to the terminal after the verification succeeds, so that the terminal continues to perform subsequent operations. This is not limited in this embodiment of the present disclosure.

Step 603*b*. Perform a Boolean operation on the orientation framing region and a virtual environment picture, to obtain the facing-direction region, the facing-direction region being an intersection region of the orientation framing region and the virtual environment picture.

The virtual environment picture displayed by the terminal is a part of the virtual environment. To facilitate the user's observation and prevent the first virtual object from automatically following virtual objects outside the virtual environment picture causing that the user cannot predict a travel direction and determine a following object, the facing-direction region in this embodiment of the present disclosure is a region in the virtual environment picture currently displayed by the terminal, that is, candidate virtual objects are all virtual objects in the virtual environment picture. In one embodiment, to ensure that the facing-direction region is located in the virtual environment picture displayed by the terminal, the terminal performs the Boolean operation on the orientation framing region and the virtual environment picture, to obtain the facing-direction region. That is, the facing-direction region is the intersection region of the orientation framing region and the virtual environment picture.

Exemplarily, as shown in FIG. 7, the terminal performs the Boolean operation on the orientation framing region 706 and a virtual environment picture 708 displayed by the terminal, to obtain a facing-direction region 709 of the first virtual object 702.

In some embodiments, after determining the facing-direction region, the terminal displays the facing-direction region in the virtual environment picture (for example, highlights the facing-direction region), so that the user knows a range of the current facing-direction region and adjusts the moving direction of the first virtual object according to an object that the user intends to make the first virtual object follow, to change the facing-direction region and make the object that the user intends to follow be in the facing-direction region.

Step 604. Determine candidate virtual objects from virtual objects in the facing-direction region.

The terminal determines the candidate virtual objects based on the orientation indicated by the moving operation on the first virtual object, and displays object identifiers corresponding to the candidate virtual objects, so that the user knows in real time virtual objects existing in a virtual environment in the front of the first virtual object. In addition, the facing-direction region is a region formed along the current orientation of the first virtual object, and the user is more likely to control the first virtual object to move to the region, and select the candidate virtual objects from the facing-direction region, which meets automatic following needs of the user better.

In some embodiments, the terminal determines the virtual objects in the facing-direction region as the candidate virtual objects, or to avoid the interference of the candidate object identifiers displayed by the terminal to the user operation when there are a large quantity of virtual objects in the facing-direction region, the terminal selects the candidate virtual objects from the virtual objects in the facing-direction region. In one embodiment, step 604 includes the following steps:

Step 604a. Determine distances between the first virtual object and the virtual objects in the facing-direction region.

In one embodiment, the terminal determines the candidate virtual objects based on the distances between the first virtual object and the virtual objects in the facing-direction region. After determining the facing-direction region, the terminal determines the distances between the first virtual object and the virtual objects in the facing-direction region based on positions of the virtual objects in the facing-direction region and the position of the first virtual object.

Step 604b. Determine k virtual objects closest to the first virtual object as the candidate virtual objects, k being a positive integer.

In this embodiment of the present disclosure, considering that the user usually intends to follow a virtual object nearby the first virtual object, the terminal determines the k virtual objects closest to the first virtual object as the candidate virtual objects. This ensures accuracy of selecting the candidate virtual objects and also controls a quantity of candidate virtual objects, to prevent excessive candidate object identifiers displayed in the virtual environment picture from affecting the user operation. If a quantity of virtual objects in the facing-direction region is less than k, the terminal determines all virtual objects in the facing-direction region as the candidate virtual objects. In another embodiment, the terminal may alternatively determine k virtual objects farthest away from the first virtual object in the facing-direction region as the candidate virtual objects.

As shown in FIG. 7, the terminal determines that four virtual objects, namely, a teammate A, a teammate B, an enemy A, and an enemy D exist in the facing-direction region 709, and the terminal determines three virtual objects closest to the first virtual object 702 as the candidate virtual objects, namely, the teammate A, the teammate B, and the enemy A.

In some embodiments, after determining the facing-direction region, the terminal determines the candidate virtual objects based on the facing-direction region; the terminal reports position information of the facing-direction region and position information of the first virtual object to a server, and the server is configured to determine the candidate virtual objects, and feed back the candidate virtual objects to the terminal; and the process of determining the candidate virtual objects may alternatively be collaboratively completed by the terminal and the server. For example, the terminal reports the candidate virtual objects to the server after determining the candidate virtual objects based on the position of the first virtual object and the facing-direction region; and the server verifies, based on the position of the first virtual object and a position of the facing-direction region, the candidate virtual objects determined by the terminal, and sends feedback information indicating that the verification succeeds to the terminal after the verification succeeds, so that the terminal continues to perform subsequent operations. This is not limited in this embodiment of the present disclosure.

Step 605. Display candidate object identifiers corresponding to the candidate virtual objects.

In one embodiment, the moving operation on the first virtual object is a control operation on a virtual joystick in a virtual environment interface. The virtual joystick is a control configured to control the first virtual object to move in the virtual environment, and the user controls the orientation of the first virtual object by controlling a joystick direction of the virtual joystick and makes the first virtual object move along the orientation.

In some embodiments, the virtual joystick displayed in the virtual environment interface has a label used for indicating the orientation (for example, an arrow pointing to the orientation); and/or the virtual joystick includes a joystick portion and a wheel portion. The terminal movably displays the joystick portion in the wheel portion based on a touch position of the user, and a direction of a connecting line between a center of the joystick portion and a center of the wheel portion is consistent with the orientation of the first virtual object. A style of the virtual joystick is not limited in this embodiment of the present disclosure.

When the user controls, through the virtual joystick, the first virtual object to move, to facilitate the user to rapidly control automatic following and simplify an operation procedure of the automatic following, the terminal displays the candidate object identifiers nearby the virtual joystick, so that the user completes selection on a target object identifier through the control operation continuously on the virtual joystick. Step 605 further includes the following steps:

Step 605a. Determine display orientations of the candidate object identifiers relative to the virtual joystick based on a moving direction indicated by the control operation, the virtual joystick and the candidate object identifiers being located on a same straight line, and a direction in which the virtual joystick points to the candidate object identifiers being consistent with the moving direction.

When terminal displays the candidate object identifiers, to facilitate the user to know current candidate virtual objects in real time, the terminal displays the candidate object identifiers nearby the virtual joystick, and the terminal enables the display orientations of the candidate object identifiers relative to the virtual joystick to be consistent with the moving direction according to the moving direction indicated by the control operation. As shown in FIG. 7, the terminal determines display orientations of candidate object identifiers 710a, 710b, and 710c based on the moving direction indicated by the control operation, so that the candidate object identifiers 710a, 710b, and 710c and a center of the virtual joystick 701 are located in a same straight line, and a direction of the straight line is consistent with the moving direction.

Step 605b. Determine display positions of the candidate object identifiers at the display orientations based on distances between the first virtual object and the candidate virtual objects, the distances between the first virtual object and the candidate virtual objects being in a positive correlation with distances between the virtual joystick and the candidate object identifiers.

Step 605c. Display the candidate object identifiers according to the display positions.

To further simplify a user operation, and improve efficiency of controlling the first virtual object to perform automatic following, the terminal determines the distances between the candidate object identifiers and the virtual joystick based on the distances between the first virtual object and the candidate virtual objects, and the distances between the first virtual object and the candidate virtual objects are in a positive correlation with the distances between the virtual joystick and the candidate object identifiers, so that the display positions of the candidate object identifiers can reflect a rough position relationship between the candidate virtual objects and the first virtual object, to help the user rapidly determine, by observing the virtual joystick and the candidate object identifiers, a target virtual object that needs to follow, and there is no need to view specific positions of the candidate virtual objects in the facing-direction region.

As shown in FIG. 7, in the facing-direction region, if candidate virtual objects corresponding to distances from the first virtual object 702 from small to large are respectively the teammate A, the teammate B, and the enemy A, the terminal displays display positions of the candidate object identifiers at the display orientation for display according to a position relationship in which a distance between the candidate object identifier 710a corresponding to the teammate A and the virtual joystick 701 is shortest and a distance between the candidate object identifier 710c corresponding to the enemy A and the virtual joystick 701 is longest.

In one embodiment, the candidate virtual objects, the first virtual object, and different candidate virtual objects may belong to different camps. Because the user may need to control the first virtual object to automatically follow a virtual object of a specified camp, the terminal may further need to display the candidate object identifiers at the display positions based on camps to which the candidate virtual objects belong. The process of displaying the candidate object identifiers in step 605 further includes the following steps:

Step 605d. Determine candidate camps to which the candidate virtual objects belong.

For example, as shown in FIG. 7, in the candidate virtual objects, the teammate A and the teammate B belong to a camp of the first virtual object 702, and the enemy A belongs to an opposing camp.

Step 605e. Display the candidate object identifiers according to preset display manners corresponding to the candidate camps, display manners corresponding to different camps being different.

In one embodiment, a correspondence between camps and the preset display manners is preset in an application, and the terminal determines the preset display manners corresponding to the candidate object identifiers based on the candidate camps, and displays the candidate object identifiers at the display positions according to the preset display manners.

For example, at least one of a color and a shape of the candidate object identifiers corresponding to the candidate virtual objects of different camps is different.

In this embodiment of the present disclosure, the terminal selects followable objects based on the orientation of the first virtual object and the orientations of the virtual objects, and is not limited by types of the virtual objects, and the terminal can control the first virtual object to automatically follow a virtual object of a different camp. Compared with a manner of selecting a following object from a camp list of a camp to which the first virtual object belongs in the related technology, on the one hand, a user operation on automatic following is simplified; and on the other hand, types of the candidate virtual objects are not limited, and the user can automatically follow virtual objects of a friendly camp and an opposing camp, which meets different following needs of the user (for example, the user intends to follow a virtual object of the same camp to jointly complete a task, or intends to follow a virtual object of the opposing camp for battle).

Step 606. Control, in response to a trigger operation on a target object identifier in the candidate object identifiers, the first virtual object to automatically follow a target virtual object in the virtual environment, the target virtual object being a virtual object corresponding to the target object identifier.

For the specific implementation of step 606, reference may be made to step 303, and details are not described again in this embodiment of the present disclosure.

Step 607. Cancel automatic following of the first virtual object to the target virtual object when the target virtual object leaves the facing-direction region or in response to a control operation on the virtual joystick.

In a process that the first virtual object automatically follows the target virtual object, the target virtual object may be beat, or rapidly moves to another region in a preset manner, to leave the facing-direction region. In this case, the terminal cancels the automatic following of the first virtual object to the target virtual object.

In some embodiments, after canceling the automatic following of the first virtual object to the target virtual object, the terminal automatically determines the candidate virtual objects; or after the terminal cancels the automatic following of the first virtual object to the target virtual object, the virtual joystick is restored to a default state and the candidate object identifiers are not displayed, until the control operation on the virtual joystick is received again.

Figure 8:
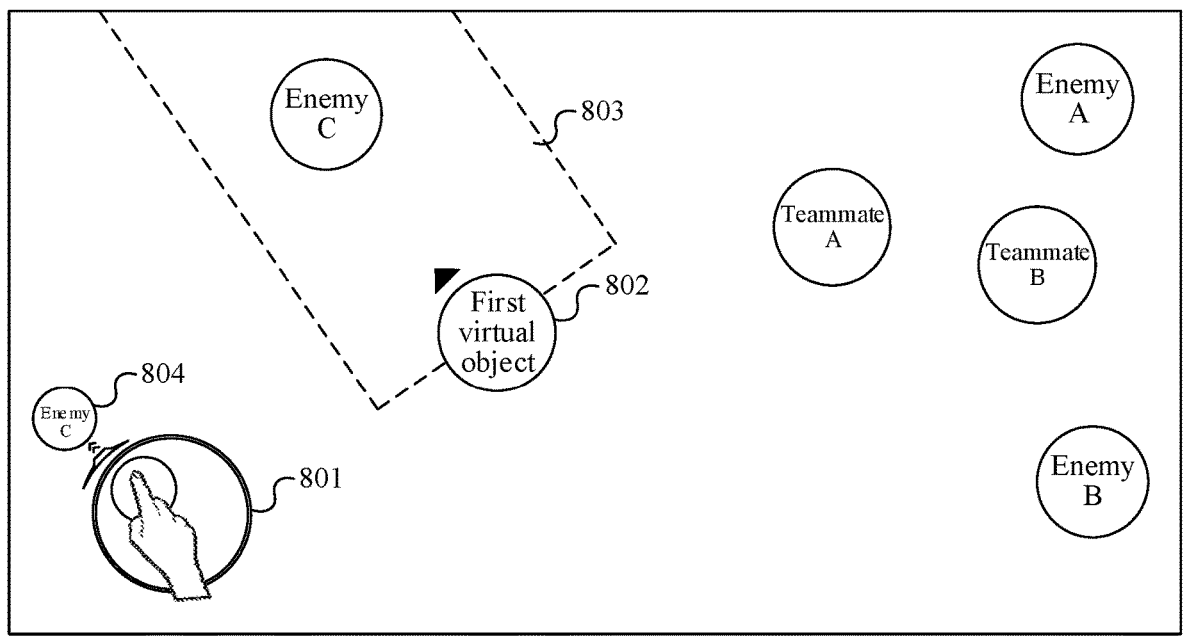
FIG. 8 is a schematic diagram of triggering to display candidate object identifiers according to another exemplary embodiment of the present disclosure.

In an automatic following state, if the user triggers the virtual joystick, it indicates that the user intends to control the first virtual object to move toward another direction, and does not continue to follow the target virtual object. Therefore, in another embodiment, when the first virtual object is in the automatic following state, the user may further trigger the virtual joystick again, so that the terminal cancels the automatic following of the first virtual object to the target virtual object. For example, the terminal performs the control operation on the virtual joystick again, to cancel the automatic following of the first virtual object to the target virtual object, and consequently the terminal redetermines a candidate virtual object based on the control operation and updates a candidate object identifier. As shown in FIG. 8, when a first virtual object 802 is in a state of automatically following an enemy A, if receiving a control operation on a virtual joystick 801 again, the terminal cancels the automatic following state of the first virtual object 802, determines an enemy C in a facing-direction region 803 as a candidate virtual object based on a moving direction indicated by the current control operation, and displays a candidate object identifier 804 based on the moving direction.

After the target virtual object leaves the facing-direction region, the terminal automatically cancels the automatic following, which can prompt the user that the virtual object is not in the facing-direction region, so that the user continues to control the first virtual object to move, or search for a more suitable automatic following object, and the user does not need to manually cancel the automatic following. When the user actively triggers the virtual joystick (or triggers the moving operation on the first virtual object in another manner), the terminal cancels the automatic following similarly, and combines the cancel operation on the automatic following with an operation procedure of the moving operation, to further simplify a user operation.

In this embodiment of the present disclosure, a terminal determines a facing-direction region based on a position and an orientation of a first virtual object, and determines candidate virtual objects from the facing-direction region. When the terminal displays candidate object identifiers, a relative orientation of the candidate object identifiers and a virtual joystick is consistent with the orientation of the first virtual object, and distances between the candidate object identifiers and the virtual joystick are proportional to distances between the first virtual object and the candidate virtual objects, so that the user can rapidly learn about candidate virtual object in the facing-direction region of the first virtual object and respective position relationships by observing the virtual joystick and the candidate object identifiers, and for candidate virtual objects of different camps, the candidate object identifiers are displayed in different preset display manners, to facilitate the user to rapidly select the candidate virtual objects according to needs, thereby improving efficiency of controlling the first virtual object to perform automatic following.

Figure 9:
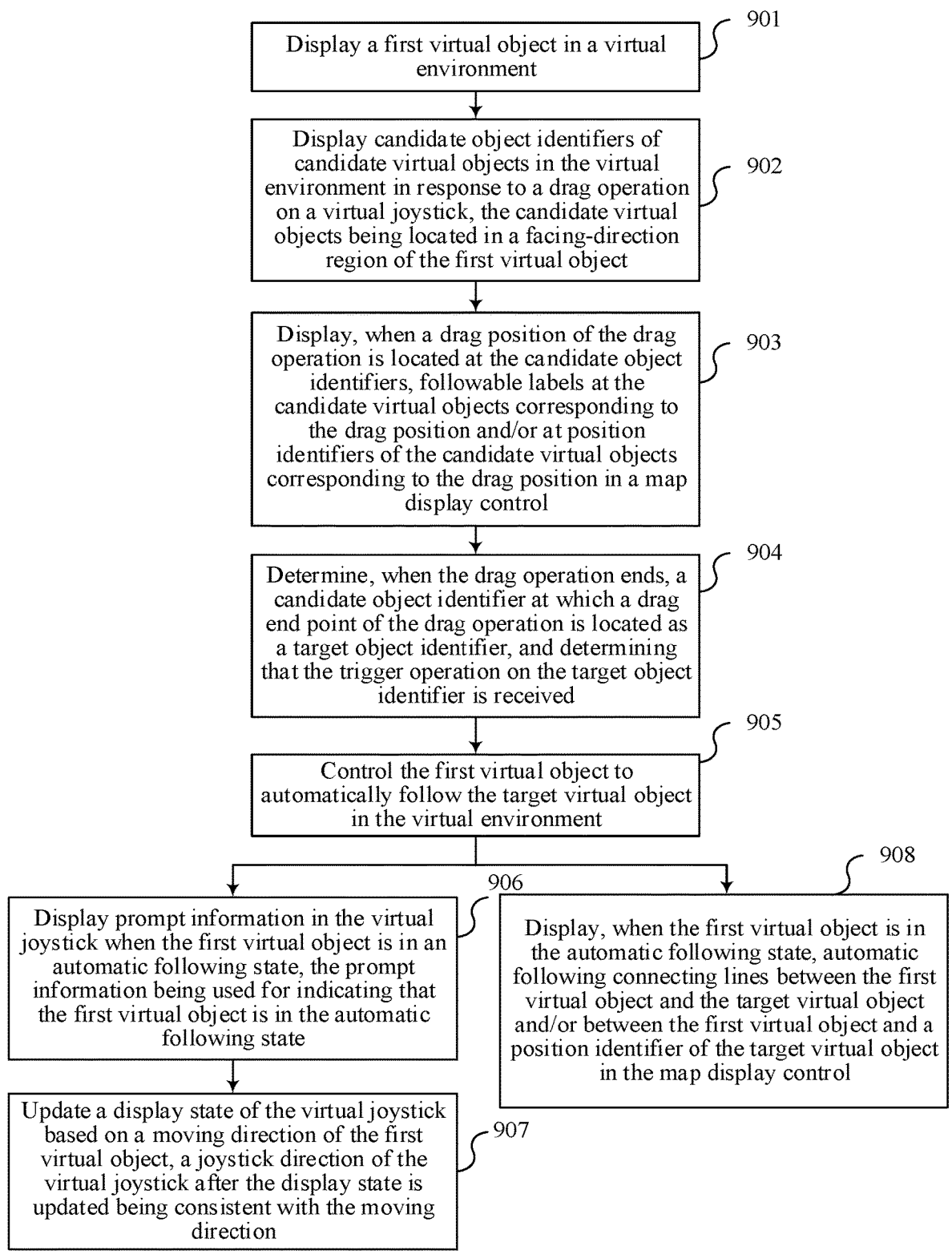
FIG. 9 is a flowchart of a virtual object control method according to another exemplary embodiment of the present disclosure.

FIG. 9 is a flowchart of a virtual object control method according to another exemplary embodiment of the present disclosure. In this embodiment, an example in which the method is applied to a terminal supporting a virtual environment is used for description. The method includes the following steps:

Step 901. Display a first virtual object located in a virtual environment.

For the specific implementation of step 901, reference may be made to step 301, and details are not described again in this embodiment of the present disclosure.

Step 902. Display candidate object identifiers of candidate virtual objects in the virtual environment in response to a drag operation on a virtual joystick, the candidate virtual objects being located in a facing-direction region of the first virtual object.

In one embodiment, a control operation on the virtual joystick is the drag operation, and the user may control a moving direction through the drag operation, for example, drag the virtual joystick in a preset interface range, or drag a movable joystick portion in a fixed wheel of the virtual joystick. In addition, display positions of the candidate object identifiers change with a drag direction of the drag operation in the virtual joystick.

Step 903. Display, when a drag position of the drag operation is located at the candidate object identifiers, followable labels at the candidate virtual objects corresponding to the drag position and/or at position identifiers of the candidate virtual objects corresponding to the drag position in a map display control.

In one embodiment, the user may move the drag position of the drag operation to a candidate object identifier, and control the first virtual object to automatically follow a virtual object corresponding to the candidate object identifier after raising a hand. When the drag operation on the virtual joystick continues from the virtual joystick outward to the candidate object identifier (the drag operation does not end in this case), the terminal displays a followable label at a corresponding candidate virtual object based on the candidate object identifier corresponding to the drag position, and/or displays the followable label at a position identifier of the corresponding candidate virtual object in the map display control, so that the user clearly determines the candidate virtual object corresponding to the current drag position, that is, the first virtual object can automatically follow the object after the hand raises. The user can determine, according to the identifier, whether to end the drag operation or change an end position of the drag operation, to facilitate the user to operate while observing, thereby improving the visibility and convenience of the automatic following operation.

Figure 10:
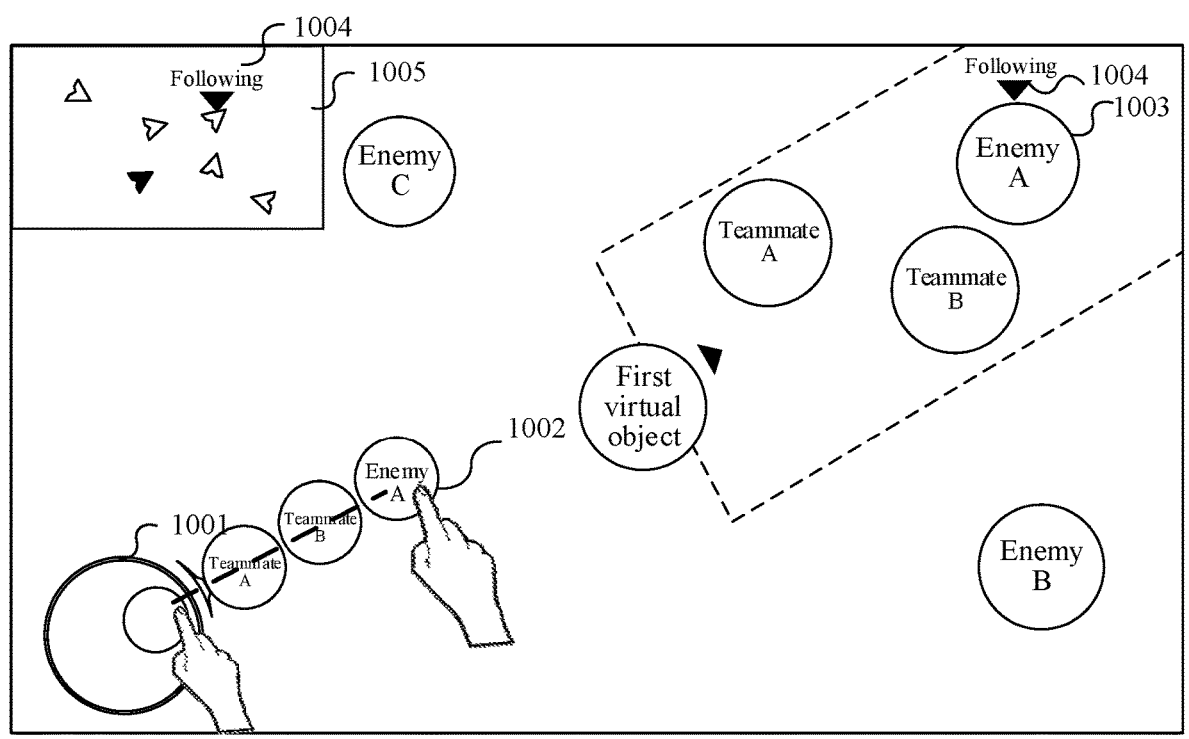
FIG. 10 is a schematic diagram of triggering to display followable labels according to an exemplary embodiment of the present disclosure.

Exemplarily, as shown in FIG. 10, when receiving a drag operation on a virtual joystick 1001, the terminal displays candidate object identifiers based on a moving direction indicated by the drag operation. When the terminal detects that a drag position of the drag operation is located at a candidate object identifier 1002 corresponding to a candidate virtual object 1003, the terminal displays a followable label 1004 above the candidate virtual object 1003, and displays the followable label 1004 at a position identifier corresponding to the candidate virtual object 1003 in a map control 1005.

Step 904. Determine, when the drag operation ends, a candidate object identifier at which a drag end point of the drag operation is located as a target object identifier, and determining that the trigger operation on the target object identifier is received.

In one embodiment, the user performs the drag operation on the virtual joystick, and continues the drag operation to a target object identifier and raises a hand, so that the terminal determines that the trigger operation on the target object identifier is received (that is, when the user performs the drag operation on the virtual joystick and raises the hand to end the drag operation at a candidate object identifier, the terminal determines the candidate object identifier as the target object identifier, and determines that the trigger operation on the target object identifier is received). As shown in FIG. 10, if the user moves the drag position of the drag operation to the candidate object identifier 1002 and raises the hand, the terminal determines the candidate object identifier 1002 as the target object identifier.

The user may perform the drag operation on the virtual joystick, so that the terminal displays the candidate object identifier while controlling the first virtual object to move. If the user needs to control the first virtual object to automatically follow the candidate virtual object, the drag operation ends at the target object identifier. The moving operation on the first virtual object and an operation procedure of the automatic following operation are combined, and the moving operation is continued, to trigger the automatic following operation, thereby further improving the convenience of controlling the first virtual object.

Step 905. Control the first virtual object to automatically follow the target virtual object in the virtual environment.

For the specific implementation of step 905, reference may be made to step 303, and details are not described again in this embodiment of the present disclosure.

Step 906. Display prompt information in the virtual joystick when the first virtual object is in an automatic following state, the prompt information being used for indicating that the first virtual object is in the automatic following state.

In one embodiment, in a process that the first virtual object automatically follows the target virtual object, the terminal displays the prompt information in the virtual joystick, to facilitate the user to determine that the first virtual object is in the automatic following state. In some embodiments, the prompt information is dynamically displayed in the virtual joystick, and a display position of the prompt information changes with the orientation of the first virtual object, so that the user rapidly knows the moving direction of the first virtual object through movement of the prompt information, and there is no need to search a virtual environment picture for the first virtual object or the target virtual object.

Figure 11:
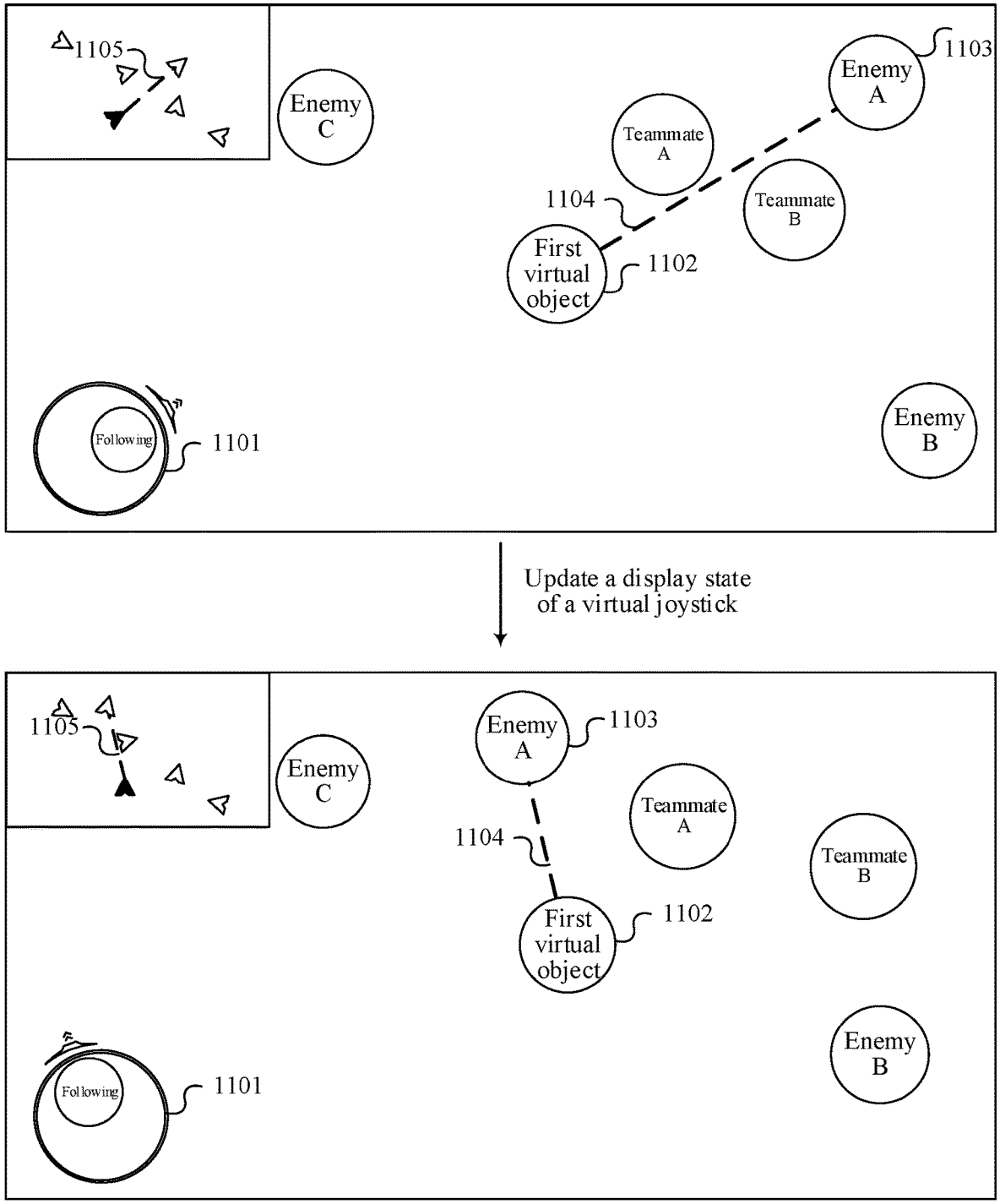
FIG. 11 is a schematic diagram of updating a display state of a virtual joystick according to an exemplary embodiment of the present disclosure.

Exemplarily, as shown in FIG. 11, a first virtual object 1102 is automatically following a target virtual object 1103, and in this case, prompt information of "following" is displayed in a virtual joystick 1101. When canceling an automatic following state of the first virtual object, the terminal also cancels the prompt information. A center of the virtual joystick 1101 points to a direction of a center of a display region of the prompt information, and is consistent with an orientation of the first virtual object 1102, that is, the prompt information moves with the first virtual object, thereby enhancing a prompt effect of automatic following, and facilitating the user to observe a change situation of the moving direction.

Step 907. Update a display state of the virtual joystick based on the moving direction of the first virtual object, a joystick direction of the virtual joystick after the display state is updated being consistent with the moving direction.

In one embodiment, to further prompt the user the moving direction of the first virtual object during automatic following, the terminal updates the joystick direction of the virtual joystick in real time, so that the virtual joystick can dynamically display the moving direction of the first virtual object.

As shown in FIG. 11, if the first virtual object 1102 is automatically following the target virtual object 1103, a joystick direction of the virtual joystick 1101 is consistent with a moving direction of the first virtual object 1102. That is, the terminal updates, according to the moving direction, a label used for indicating the joystick direction and a display position of a movable joystick portion in the virtual joystick 1101. As shown in the figure, when the target virtual object 1103 moves from an upper right corner of a virtual environment picture to a position directly above the virtual environment picture, the moving direction of the first virtual object 1102 also changes, and the terminal updates a display state of the virtual joystick 1101 based on the moving direction of the first virtual object 1102.

Step 908. Display, when the first virtual object is in the automatic following state, automatic following connecting lines between the first virtual object and the target virtual object and/or between the first virtual object and a position identifier of the target virtual object in the map display control.

To further prompt the user that the first virtual object is in the automatic following state, and also indicate the target virtual object followed by the first virtual object and the moving direction of the first virtual object, the terminal displays the automatic following connecting lines between the first virtual object and the target virtual object in the virtual environment and/or between the first virtual object and the position identifier of the target virtual object in the map display control. The movement of the first virtual object is not controlled by the user in the automatic following state, and it is difficult for the user to predict a movement path of the target virtual object, while the automatic following connecting line is more obvious than other display content in the virtual environment. Therefore, the user can rapidly position positions of the first virtual object and the target virtual object and the moving direction according to the automatic following connecting line. When canceling the automatic following of the first virtual object to the target virtual object, the terminal cancels the automatic following connecting line.

As shown in FIG. 11, the first virtual object 1102 is automatically following the target virtual object 1103, and the terminal displays an automatic following connecting line 1104 between the first virtual object 1102 and the target virtual object 1103, and displays an automatic following connecting line 1105 between the first virtual object 1102 and a position identifier corresponding to the target virtual object 1103 in a map display control.

In this embodiment of the present disclosure, when a drag position of a drag operation on a virtual joystick is moved to candidate object identifiers, followable labels are displayed at corresponding candidate virtual objects, to facilitate a user to clearly determine positions of the candidate virtual objects. The user may perform the drag operation on the virtual joystick, so that a terminal displays the candidate object identifiers while controlling a first virtual object to move. If the user needs to control the first virtual object to automatically follow a candidate virtual object, the drag operation ends at a target object identifier. The operation is simple and rapid, and the user operation is further simplified. In a process that the first virtual object is in an automatic following state, an automatic following connecting line is displayed, and a joystick direction of the virtual joystick is updated based on a moving direction of the first virtual object, to facilitate the user to timely learn about the moving direction of the first virtual object and a position of the target virtual object.

Figure 12:
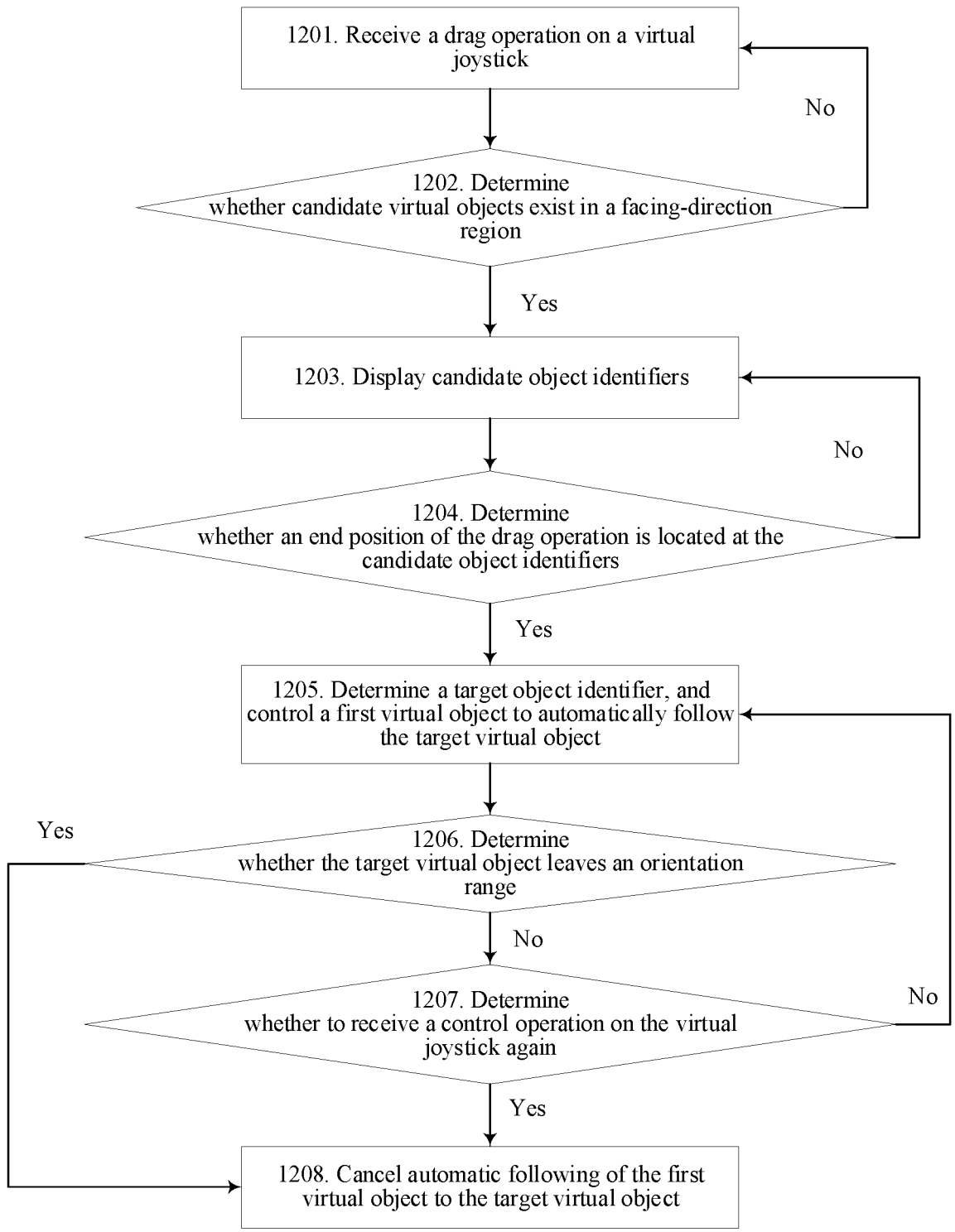
FIG. 12 is a flowchart of a virtual object control method according to another exemplary embodiment of the present disclosure.

With reference to the embodiments, in an exemplary example, a procedure of controlling a virtual object is shown in FIG. 12.

Step 1201. Receive a drag operation on a virtual joystick.

Step 1202. Determine whether candidate virtual objects exist in a facing-direction region. If yes, perform step 1203.

Step 1203. Display candidate object identifiers.

Step 1204. Determine whether an end position of the drag operation is located at the candidate object identifiers. If yes, perform step 1205; otherwise, return to step 1203.

Step 1205. Determine a target object identifier, and control a first virtual object to automatically follow the target virtual object.

Step 1206. Determine whether the target virtual object leaves an orientation range. If yes, perform step 1208; otherwise, perform step 1207.

Step 1207. Determine whether to receive a control operation on the virtual joystick again. If yes, perform step 1208; otherwise, return to step 1205.

Step 1208. Cancel automatic following of the first virtual object to the target virtual object.

Figure 13:
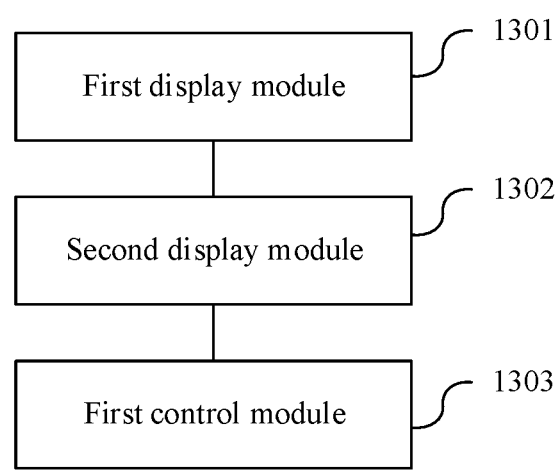
FIG. 13 is a structural block diagram of a virtual object control apparatus according to an exemplary embodiment of the present disclosure.

FIG. 13 is a structural block diagram of a virtual object control apparatus according to an exemplary embodiment of the present disclosure. The apparatus includes:
- a first display module 1301, configured to display a first virtual object located in a virtual environment;
- a second display module 1302, configured to display candidate object identifiers corresponding to candidate virtual objects in the virtual environment in response to a moving operation on the first virtual object, the candidate virtual objects being located in a facing-direction region of the first virtual object; and
- a first control module 1303, configured to control, in response to a trigger operation on a target object identifier in the candidate object identifiers, the first virtual object to automatically follow a target virtual object in the virtual environment, the target virtual object being a virtual object corresponding to the target object identifier.

In some embodiments, the second display module 1302 includes:
- a first determining unit, configured to determine an orientation of the first virtual object based on a moving direction indicated by the moving operation;

a second determining unit, configured to determine the facing-direction region based on a position of the first virtual object in the virtual environment and the orientation;

a third determining unit, configured to determine the candidate virtual objects from virtual objects in the facing-direction region; and a first display unit, configured to display the candidate object identifiers corresponding to the candidate virtual objects.

In some embodiments, the third determining unit is further configured to:

determine distances between the first virtual object and the virtual objects in the facing-direction region; and determine k virtual objects closest to the first virtual object as the candidate virtual objects, k being a positive integer.

In some embodiments, the moving operation includes a control operation on a virtual joystick in a virtual environment interface; and the first display unit is further configured to:

determine display orientations of the candidate object identifiers relative to the virtual joystick based on a moving direction indicated by the control operation, the virtual joystick and the candidate object identifiers being located on a same straight line, and a direction in which the virtual joystick points to the candidate object identifiers being consistent with the moving direction;

determine display positions of the candidate object identifiers at the display orientations based on distances between the first virtual object and the candidate virtual objects, the distances between the first virtual object and the candidate virtual objects being in a positive correlation with distances between the virtual joystick and the candidate object identifiers; and display the candidate object identifiers according to the display positions.

In some embodiments, the second determining unit is further configured to:

determine an orientation framing region based on the position of the first virtual object and the orientation, the orientation framing region being a rectangular region formed along the orientation, a width of the rectangular region being a preset width, the first virtual object being located at a shorter side of the rectangular region, and a length of a longer side of the rectangular region being a distance from the first virtual object to a virtual environment boundary in a direction of the orientation; and perform a Boolean operation on the orientation framing region and a virtual environment picture, to obtain the facing-direction region, the facing-direction region being an intersection region of the orientation framing region and the virtual environment picture.

In some embodiments, the second display module 1302 further includes:

a fourth determining unit, configured to determine candidate camps to which the candidate virtual objects belong; and a second display unit, configured to display the candidate object identifiers according to preset display manners corresponding to the candidate camps, preset display manners corresponding to different camps being different.

In some embodiments, the moving operation is a drag operation on the virtual joystick in the virtual environment interface; and the first control module 1303 includes:

a fifth determining unit, configured to determine, when the drag operation ends, a candidate object identifier at which a drag end point of the drag operation is located as the target object identifier, and determine that the trigger operation on the target object identifier is received; and a control unit, configured to control the first virtual object to automatically follow the target virtual object in the virtual environment.

In some embodiments, the apparatus further includes:

a third display module, configured to display, when a drag position of the drag operation is located at the candidate object identifiers, followable labels at the candidate virtual objects corresponding to the drag position and/or at position identifiers of the candidate virtual objects corresponding to the drag position in a map display control.

In some embodiments, the moving operation includes a control operation on a virtual joystick in a virtual environment interface; and the apparatus further includes:

a fourth display module, configured to display prompt information in the virtual joystick when the first virtual object is in an automatic following state, the prompt information being used for indicating that the first virtual object is in the automatic following state; and a fifth display module, configured to update a display state of the virtual joystick based on a moving direction of the first virtual object, a joystick direction of the virtual joystick after the display state is updated being consistent with the moving direction.

In some embodiments, the apparatus further includes:

a sixth display module, configured to display, when the first virtual object is in the automatic following state, automatic following connecting lines between the first virtual object and the target virtual object and/or between the first virtual object and a position identifier of the target virtual object in a map display control.

In some embodiments, the apparatus further includes:

a second control module, configured to cancel automatic following of the first virtual object to the target virtual object when the target virtual object leaves the facing-direction region or in response to a control operation on the virtual joystick.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

In conclusion, in the embodiments of the present disclosure, candidate object identifiers are displayed when a control operation on a virtual joystick is received, so that a user can clearly determine virtual objects in a facing-direction region of the first virtual object through the candidate object identifiers when controlling the first virtual object to move, and select a target virtual object from candidate virtual objects through a simple operation. Therefore, the first virtual object automatically follows the target virtual object, and there is no need to select a following object from a virtual object list and perform a following operation, thereby simplifying a user operation, and improving efficiency of making the first virtual object enter an automatic following state. The candidate virtual objects are determined based on an orientation of the first virtual object, so that the determined candidate virtual objects meet actual operation needs of the user better, and validity of the candidate object identifiers are improved.

Figure 14:
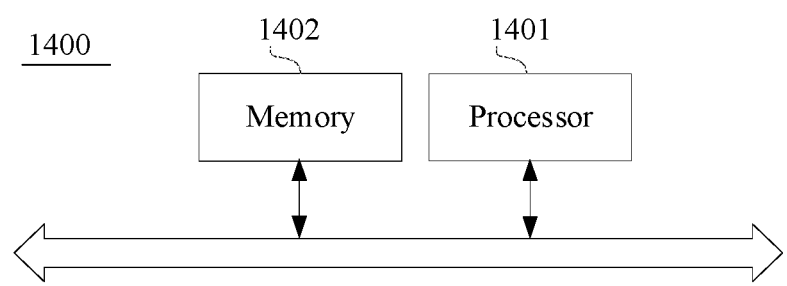
FIG. 14 is a structural block diagram of a terminal according to an exemplary embodiment of the present disclosure.

FIG. 14 is a structural block diagram of a terminal 1400 according to an exemplary embodiment of the present disclosure. The terminal 1400 may be portable mobile terminal, for example, a smartphone, a tablet computer, an MP3, or an MP4 player. The terminal 1400 may also be referred to as other names such as user equipment and a portable terminal.

Generally, the terminal 1400 includes a processor 1401 and a memory 1402.

The processor 1401 may include one or more processing cores, for example, a 4-core processor or an 8-core processor. The processor 1401 may be implemented by using at least one hardware form of a digital signal processor (DSP), a field-programmable gate array (FPGA), and a programmable logic array (PLA). The processor 1401 may alternatively include a main processor and a coprocessor. The main processor is a processor configured to process data in an active state, also referred to as a central processing unit (CPU). The coprocessor is a low-power processor configured to process data in a standby state. In some embodiments, the processor 1401 may be integrated with a graphics processing unit (GPU). The GPU is configured to render and draw content that needs to be displayed on a display screen. In some embodiments, the processor 1401 may further include an artificial intelligence (AI) processor. The AI processor is configured to process a computing operation related to machine learning.

The memory 1402 may include one or more computer-readable storage media. The computer-readable storage medium may be tangible and non-transient. The memory 1402 may further include a high-speed random access memory and a non-volatile memory, for example, one or more disk storage devices or flash storage devices. In some embodiments, a non-transient computer-readable storage medium in the memory 1402 is configured to store at least one instruction, the at least one instruction being configured to be executed by the processor 1401 to implement the method provided in the embodiments of the present disclosure.

A person skilled in the art may understand that a structure shown in FIG. 14 constitutes no limitation on the terminal 1400, and the terminal may include more or fewer components than those shown in the figure, or some components may be combined, or a different component deployment may be used.

An embodiment of the present disclosure further provides a computer-readable storage medium, storing at least one instruction, the at least one instruction being loaded and executed by a processor to implement the virtual object control method described in the foregoing embodiments.

According to an aspect of the present disclosure, a computer program product or a computer program is provided, including computer instructions, the computer instructions being stored in a computer-readable storage medium. A processor of a computer device reads the computer instructions from the computer-readable storage medium, and executes the computer instructions, so that the computer device performs the virtual object control method provided in embodiments in the foregoing aspect.

What is claimed is:

1. A virtual object control method, applied to a terminal, the method comprising:
displaying a first virtual object located in a virtual environment;
displaying one or more candidate object identifiers corresponding to one or more candidate virtual objects in the virtual environment in response to a moving operation on the first virtual object, the one or more candidate virtual objects being located in a facing-direction region of the first virtual object; and
controlling, in response to a trigger operation on a target object identifier in the one or more candidate object identifiers, the first virtual object to automatically follow a target virtual object in the virtual environment, the target virtual object being a virtual object corresponding to the target object identifier.

2. The method according to claim 1, wherein the displaying one or more candidate object identifiers corresponding to one or more candidate virtual objects in the virtual environment in response to a moving operation on the first virtual object comprises:
in response to the moving operation on the first virtual object, determining an orientation of the first virtual object based on a moving direction indicated by the moving operation;
determining the facing-direction region based on a position of the first virtual object in the virtual environment and the orientation;
determining the one or more candidate virtual objects from one or more virtual objects in the facing-direction region; and
displaying the one or more candidate object identifiers corresponding to the one or more candidate virtual objects.

3. The method according to claim 2, wherein the determining the one or more candidate virtual objects from one or more virtual objects in the facing-direction region comprises:
determining distances between the first virtual object and the one or more virtual objects in the facing-direction region; and
determining k virtual objects closest to the first virtual object as the one or more candidate virtual objects, k being a positive integer.

4. The method according to claim 3, wherein the moving operation comprises a control operation on a virtual joystick in a virtual environment interface; and the displaying the one or more candidate object identifiers corresponding to the one or more candidate virtual objects comprises:
determining display orientations of the one or more candidate object identifiers relative to the virtual joystick based on a moving direction indicated by the control operation, the virtual joystick and the one or more candidate object identifiers being located on a same straight line, and a direction in which the virtual joystick points to the one or more candidate object identifiers being consistent with the moving direction;
determining display positions of the one or more candidate object identifiers at the display orientations based on distances between the first virtual object and the one or more candidate virtual objects, the distances between the first virtual object and the one or more candidate virtual objects having in a positive correlation with distances between the virtual joystick and the one or more candidate object identifiers; and
displaying the one or more candidate object identifiers according to the display positions.

5. The method according to claim 2, wherein the determining the facing-direction region based on a position of the first virtual object in the virtual environment and the orientation comprises:
  determining an orientation framing region based on the position of the first virtual object and the orientation, the orientation framing region being a rectangular region formed along the orientation, a width of the rectangular region being a preset width, the first virtual object being located at a shorter side of the rectangular region, and a length of a longer side of the rectangular region being a distance from the first virtual object to a virtual environment boundary in a direction of the orientation; and
  performing a Boolean operation on the orientation framing region and a virtual environment picture, to obtain the facing-direction region, the facing-direction region being an intersection region of the orientation framing region and the virtual environment picture.

6. The method according to claim 1, wherein the displaying one or more candidate object identifiers corresponding to one or more candidate virtual objects in the virtual environment further comprises:
  determining candidate camps to which the one or more candidate virtual objects belong; and
  displaying the one or more candidate object identifiers according to display manners corresponding to the candidate camps, display manners corresponding to different camps being different.

7. The method according to claim 1, wherein the moving operation is a drag operation on the virtual joystick in the virtual environment interface; and
  the controlling, in response to a trigger operation on a target object identifier in the one or more candidate object identifiers, the first virtual object to automatically follow a target virtual object in the virtual environment comprises:
  determining, when the drag operation ends, a candidate object identifier at which a drag end point of the drag operation is located as the target object identifier, and determining that the trigger operation on the target object identifier is received; and
  controlling the first virtual object to automatically follow the target virtual object in the virtual environment.

8. The method according to claim 7, wherein before the controlling, in response to a trigger operation on a target object identifier in the one or more candidate object identifiers, the first virtual object to automatically follow a target virtual object in the virtual environment, the method further comprises:
  displaying, when a drag position of the drag operation is located at the one or more candidate object identifiers, followable labels at the one or more candidate virtual objects corresponding to the drag position and/or at position identifiers of the one or more candidate virtual objects corresponding to the drag position in a map display control.

9. The method according to claim 1, wherein the moving operation comprises a control operation on a virtual joystick in a virtual environment interface; and after the controlling, in response to a trigger operation on a target object identifier in the one or more candidate object identifiers, the first virtual object to automatically follow a target virtual object in the virtual environment, the method further comprises:
  displaying prompt information in the virtual joystick when the first virtual object is in an automatic following state, the prompt information being used for indicating that the first virtual object is in the automatic following state; and
  updating a display state of the virtual joystick based on a moving direction of the first virtual object, a joystick direction of the virtual joystick after the display state is updated being consistent with the moving direction.

10. The method according to claim 1, wherein after the controlling, in response to a trigger operation on a target object identifier in the one or more candidate object identifiers, the first virtual object to automatically follow a target virtual object in the virtual environment, the method further comprises:
  displaying, when the first virtual object is in an automatic following state, automatic following connecting lines between the first virtual object and the target virtual object and/or between position identifiers of the first virtual object and the target virtual object in a map display control.

11. The method according to claim 1, wherein after the controlling, in response to a trigger operation on a target object identifier in the one or more candidate object identifiers, the first virtual object to automatically follow a target virtual object in the virtual environment, the method further comprises:
  canceling automatic following of the first virtual object to the target virtual object when the target virtual object leaves the facing-direction region or in response to an updated moving operation on the first virtual object.

12. A virtual object control apparatus, comprising a memory and a processor coupled to the memory, the processor being configured to perform:
  displaying a first virtual object located in a virtual environment;
  displaying one or more candidate object identifiers corresponding to one or more candidate virtual objects in the virtual environment in response to a moving operation on the first virtual object, the one or more candidate virtual objects being located in a facing-direction region of the first virtual object; and
  controlling, in response to a trigger operation on a target object identifier in the one or more candidate object identifiers, the first virtual object to automatically follow a target virtual object in the virtual environment, the target virtual object being a virtual object corresponding to the target object identifier.

13. The apparatus according to claim 12, wherein the displaying one or more candidate object identifiers corresponding to one or more candidate virtual objects in the virtual environment in response to a moving operation on the first virtual object comprises:
  in response to the moving operation on the first virtual object, determining an orientation of the first virtual object based on a moving direction indicated by the moving operation;
  determining the facing-direction region based on a position of the first virtual object in the virtual environment and the orientation;
  determining the one or more candidate virtual objects from one or more virtual objects in the facing-direction region; and
  displaying the one or more candidate object identifiers corresponding to the one or more candidate virtual objects.

14. The apparatus according to claim 13, wherein the determining the one or more candidate virtual objects from one or more virtual objects in the facing-direction region comprises:

determining distances between the first virtual object and the one or more virtual objects in the facing-direction region; and determining k virtual objects closest to the first virtual object as the one or more candidate virtual objects, k being a positive integer.

15. The apparatus according to claim 14, wherein the moving operation comprises a control operation on a virtual joystick in a virtual environment interface; and the displaying the one or more candidate object identifiers corresponding to the one or more candidate virtual objects comprises:

determining display orientations of the one or more candidate object identifiers relative to the virtual joystick based on a moving direction indicated by the control operation, the virtual joystick and the one or more candidate object identifiers being located on a same straight line, and a direction in which the virtual joystick points to the one or more candidate object identifiers being consistent with the moving direction;

determining display positions of the one or more candidate object identifiers at the display orientations based on distances between the first virtual object and the one or more candidate virtual objects, the distances between the first virtual object and the one or more candidate virtual objects having in a positive correlation with distances between the virtual joystick and the one or more candidate object identifiers; and displaying the one or more candidate object identifiers according to the display positions.

16. The apparatus according to claim 13, wherein the determining the facing-direction region based on a position of the first virtual object in the virtual environment and the orientation comprises:

determining an orientation framing region based on the position of the first virtual object and the orientation, the orientation framing region being a rectangular region formed along the orientation, a width of the rectangular region being a preset width, the first virtual object being located at a shorter side of the rectangular region, and a length of a longer side of the rectangular region being a distance from the first virtual object to a virtual environment boundary in a direction of the orientation; and performing a Boolean operation on the orientation framing region and a virtual environment picture, to obtain the facing-direction region, the facing-direction region being an intersection region of the orientation framing region and the virtual environment picture.

17. The apparatus according to claim 12, wherein the displaying one or more candidate object identifiers corresponding to one or more candidate virtual objects in the virtual environment further comprises:

determining candidate camps to which the one or more candidate virtual objects belong; and displaying the one or more candidate object identifiers according to display manners corresponding to the candidate camps, display manners corresponding to different camps being different.

18. The apparatus according to claim 12, wherein the moving operation is a drag operation on the virtual joystick in the virtual environment interface; and the controlling, in response to a trigger operation on a target object identifier in the one or more candidate object identifiers, the first virtual object to automatically follow a target virtual object in the virtual environment comprises:

determining, when the drag operation ends, a candidate object identifier at which a drag end point of the drag operation is located as the target object identifier, and determining that the trigger operation on the target object identifier is received; and controlling the first virtual object to automatically follow the target virtual object in the virtual environment.

19. The apparatus according to claim 18, wherein before the controlling, in response to a trigger operation on a target object identifier in the one or more candidate object identifiers, the first virtual object to automatically follow a target virtual object in the virtual environment, the processor is further configured to perform:

displaying, when a drag position of the drag operation is located at the one or more candidate object identifiers, followable labels at the one or more candidate virtual objects corresponding to the drag position and/or at position identifiers of the one or more candidate virtual objects corresponding to the drag position in a map display control.

20. A non-transitory computer-readable storage medium, storing at least one computer program, the computer program being loaded and executed by a processor to implement:

displaying a first virtual object located in a virtual environment;

displaying one or more candidate object identifiers corresponding to one or more candidate virtual objects in the virtual environment in response to a moving operation on the first virtual object, the one or more candidate virtual objects being located in a facing-direction region of the first virtual object; and controlling, in response to a trigger operation on a target object identifier in the one or more candidate object identifiers, the first virtual object to automatically follow a target virtual object in the virtual environment, the target virtual object being a virtual object corresponding to the target object identifier.

* * * * *